(12) United States Patent
Okada

(10) Patent No.: US 8,380,817 B2
(45) Date of Patent: Feb. 19, 2013

(54) INFORMATION PROCESSING SYSTEM, INFORMATION PROCESSING METHOD, AND COMPUTER PROGRAM USED THEREWITH

(75) Inventor: Ryohei Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 1735 days.

(21) Appl. No.: 11/180,218

(22) Filed: Jul. 13, 2005

(65) Prior Publication Data

US 2006/0015585 A1    Jan. 19, 2006

(30) Foreign Application Priority Data

Jul. 16, 2004   (JP) .............................. P2004-210762

(51) Int. Cl.
*G06F 15/16* (2006.01)
*G06F 15/177* (2006.01)

(52) U.S. Cl. .......................... 709/219; 709/201; 709/220

(58) Field of Classification Search .................. 709/201, 709/219, 220
See application file for complete search history.

(56) References Cited

U.S. PATENT DOCUMENTS

| | | | | |
|---|---|---|---|---|
| 5,898,870 | A * | 4/1999 | Okuda et al. ................... | 718/104 |
| 6,282,578 | B1 * | 8/2001 | Aizono et al. ................. | 719/310 |
| 2003/0167270 | A1 * | 9/2003 | Werme et al. .................. | 707/10 |
| 2003/0191829 | A1 * | 10/2003 | Masters et al. ................. | 709/223 |
| 2005/0154789 | A1 * | 7/2005 | Fellenstein et al. ........... | 709/223 |
| 2005/0283786 | A1 * | 12/2005 | Dettinger et al. ............. | 718/104 |

FOREIGN PATENT DOCUMENTS

| | | |
|---|---|---|
| JP | 10-075219 | 3/1998 |
| JP | HEI 10-075219 | 3/1998 |
| JP | 2002-342165 | 11/2002 |
| JP | 2002-351850 | 12/2002 |
| JP | 2002-358289 | 12/2002 |
| JP | 2002-366533 | 12/2002 |
| JP | 2002-366534 | 12/2002 |
| JP | 2003-223590 | 8/2003 |
| JP | 2003-315994 | 11/2003 |
| JP | 2003-316994 | 11/2003 |

OTHER PUBLICATIONS

Japanese Office Action issued on Jun. 29, 2010 corresponding to Japanese Patent Appln. No. 2004-210762.

* cited by examiner

*Primary Examiner* — Wing F Chan
*Assistant Examiner* — David X Yi
(74) *Attorney, Agent, or Firm* — K&L Gates LLP

(57) ABSTRACT

Information processing system, information processing method, and computer program used therewith are provided. An information processing system includes information processing apparatuses connected to a network. The apparatuses are mutually linked to operate as a virtual information processing apparatus. The system includes a monitoring unit for monitoring the system state of the virtual information processing apparatus which includes the surplus capability of the virtual information processing apparatus and the configuration of the information processing apparatuses connected to the network, a start-condition setting unit for setting a relationship between the system state of the virtual information processing apparatus and an executable function, a function executing unit for, when the system state satisfies predetermined start conditions, executing a corresponding function, and a function-utilization-history-information storing unit for storing utilization history information obtained when the corresponding function is executed by said function executing unit.

17 Claims, 20 Drawing Sheets

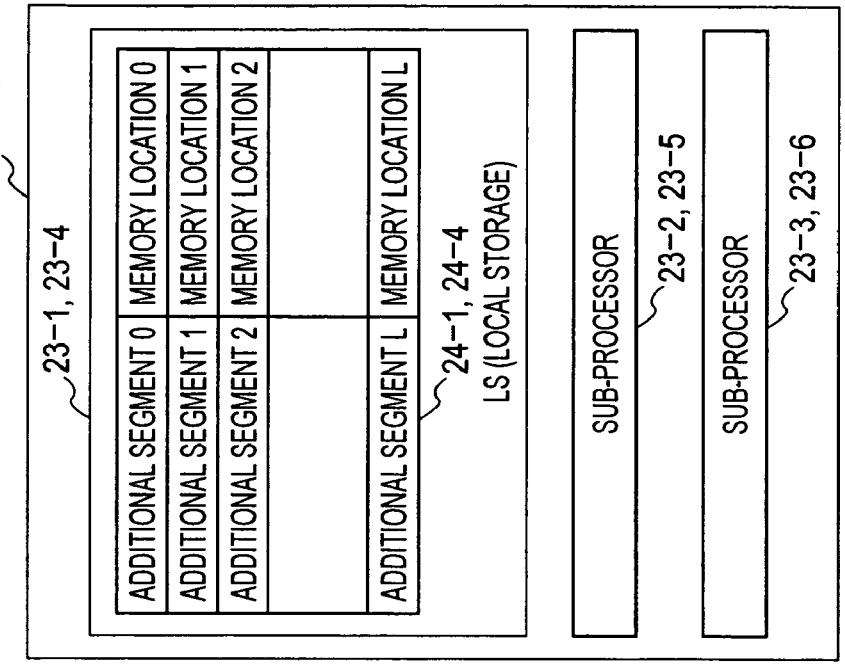
FIG. 2B
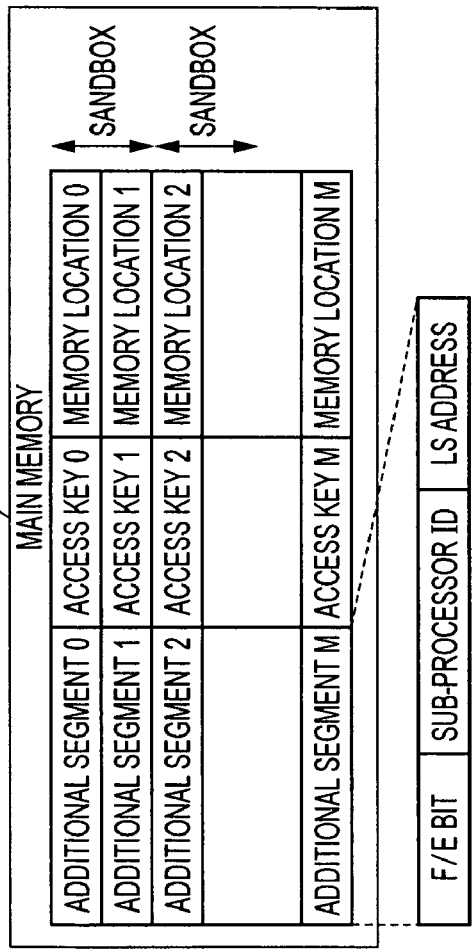
FIG. 2A
FIG. 2C

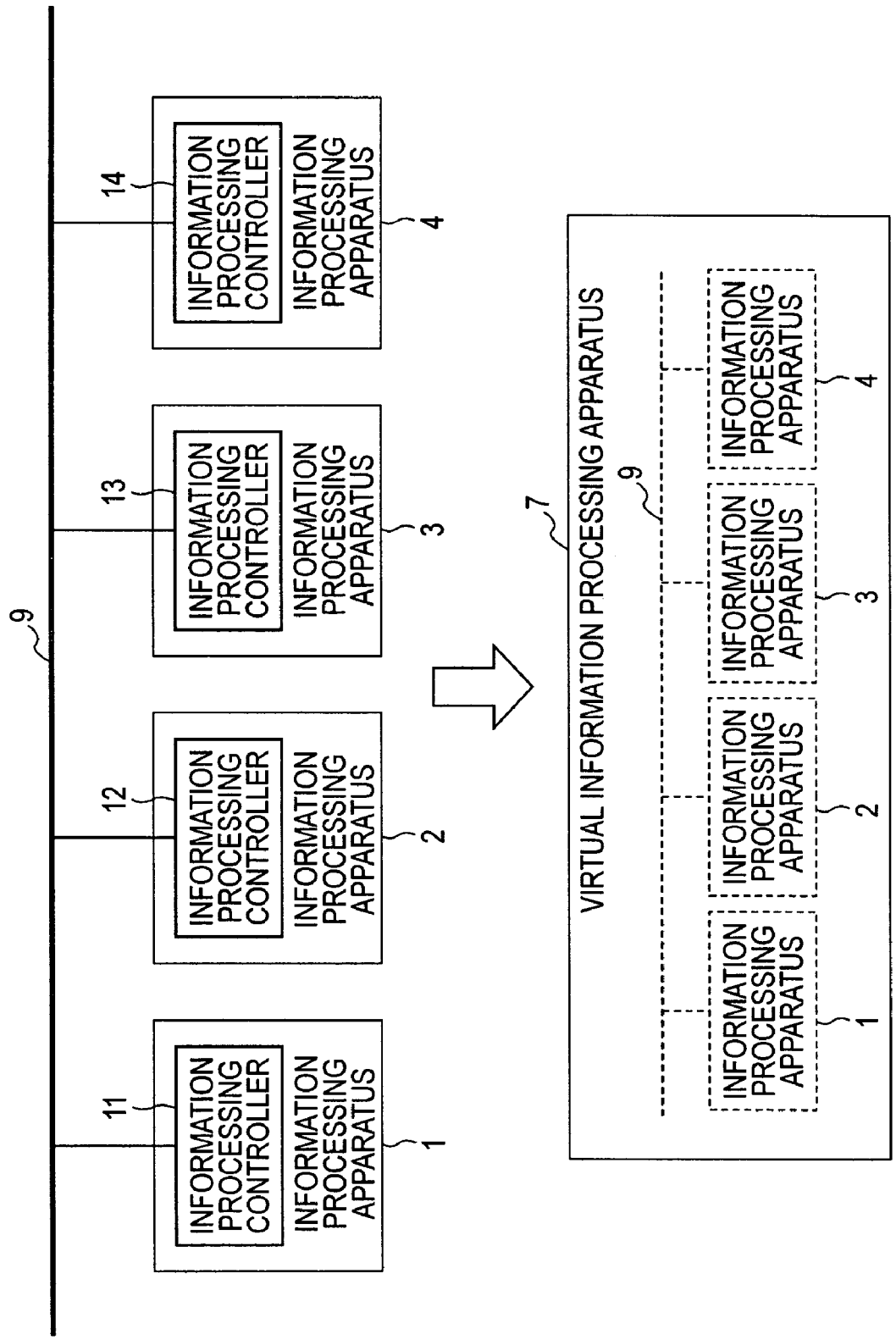

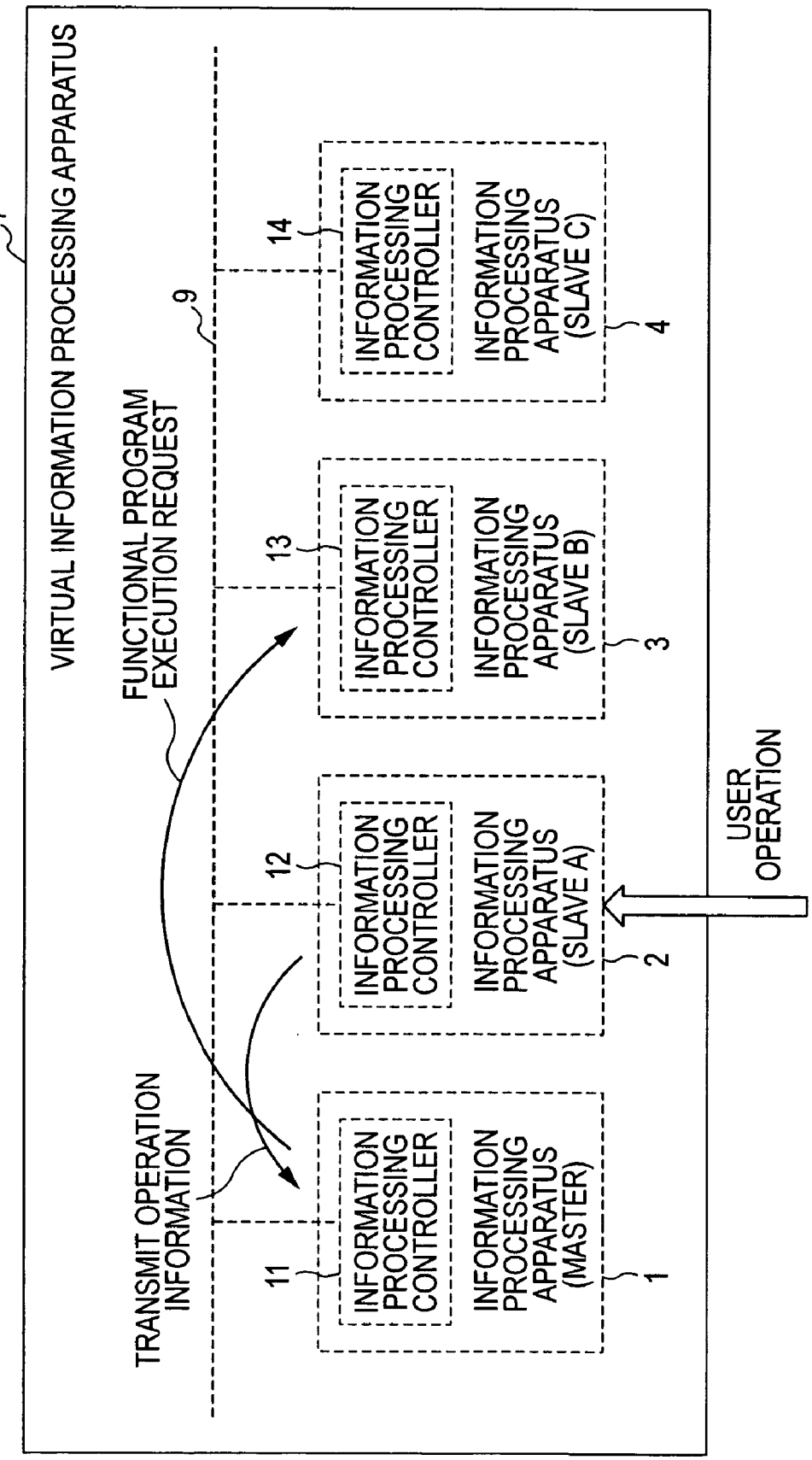

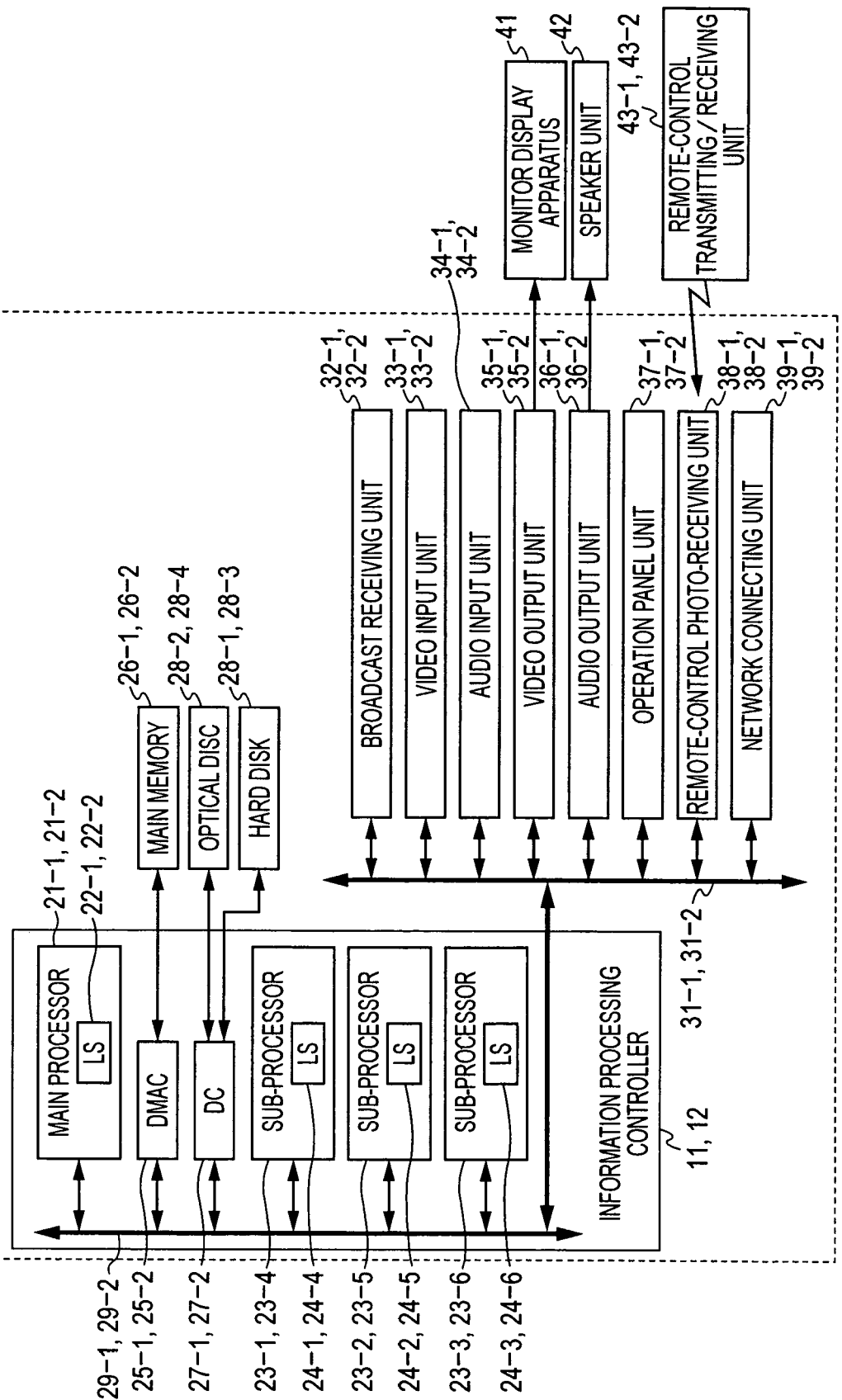

INFORMATION PROCESSING SYSTEM, INFORMATION PROCESSING METHOD, AND COMPUTER PROGRAM USED THEREWITH

CROSS REFERENCES TO RELATED APPLICATIONS

The present invention claims priority to Japanese Patent Application JP 2004-210762, filed in the Japanese Patent Office on Jul. 16, 2004, the entire contents of which being incorporated herein by reference.

BACKGROUND

The present invention relates to information processing systems and information processing methods that link the operation of two or more network-connected apparatuses, and to computer programs used with the systems and methods. In particular, the present invention relates to an information processing system and information processing method in which a plurality of network-connected apparatuses cooperatively operate to perform distributed processing, whereby the apparatuses operate as a virtual information processing apparatus, and to a computer program used with the system and method.

More specifically, the present invention relates to an information processing system and information processing method which execute a predetermined function by utilizing the surplus processing capability of a virtual apparatus including a plurality of network-connected apparatuses, and to a computer program used with the system and method. In particular, the present invention relates to an information processing system and information processing method that realize a function in accordance with a system state varying depending on the surplus processing capability of a virtual apparatus including a plurality of network-connected apparatuses and on a connecting state of the apparatuses.

It is known that, by using a network to connect a plurality of computers to one another, sharing of information resources, sharing of hardware resources, and collaboration among a plurality of users are realized. Regarding connecting media between computers, there are various types such as a local area network (LAN), a wide area network (WAN), and the Internet.

In particular, recently, technologies of computers, networks, etc., have become greatly widespread even in general households. Information equipment such as in-house personal computers and personal digital assistants (PDAs), audio/video (AV) equipment such as television receivers and video players, various types of home information appliances, consumer electronics (CE) equipment, etc., are connected to one another by a home network. In many cases, this home network is connected to an external wide area network such as the Internet through a router.

Although, as described above, a utilization form in which a plurality of AV devices are connected to a home network is assumed, this form has a problem in that there is no sufficient linkage among the AV devices. On this problem, recently, research and development concerning grid computing for realizing high calculation performance in order to link devices on a network have been advanced (see, for example, Japanese Unexamined Patent Application Publication Nos. 2002-342165, 2002-351850, 2002-358289, 2002-366533, and 2002-366534).

According to the grid computing technology, a plurality of information processing apparatuses on a network can cooperatively operate to perform distributed processing, whereby they can operate for a user as a virtual information processing apparatus.

For example, when a plurality of information processing apparatuses having recording reservation functions are connected to a network, they can realize cooperative operation for recording reservation. Specifically, when information processing apparatuses mutually link the recording reserving operation thereof via a home network, they operate as a virtual recorder on the home network. In addition, by using a user interface of one of the information processing apparatuses, a user can use an arbitrary apparatus connected to the home network to perform recording reservation.

Furthermore, by linking their recording reservation functions, programs (so-called "counterprograms"), which have identical recording-reservation times, can be simultaneously recorded. Similarly, by linking the recorded-content playback operation of a plurality of apparatuses, simultaneous and synchronized playback of content can be realized. By using the linkage of the recorded-content playback operation to simultaneously and synchronously advance playback of pieces of content recorded by different apparatuses, the concept of channel switching can be introduced in content playback.

According to such a virtual information processing apparatus, even if it is difficult for only the hardware resources and processing capability of a single information processing apparatus to cope with a request from a user, by utilizing the surplus processing capability of another information processing apparatus which is linked to cooperatively operates on the network, the virtual information processing apparatus can meet the user's request. Furthermore, a service that is not realistic with a normal information processing apparatus can be realized.

Functions that can be realized by the virtual information processing apparatus vary depending on a system state including the types and number of network-connected apparatuses, and the surplus processing capability of each apparatus. However, the information processing apparatuses, which are linked to operate, are scattered in a physical space through the network, so that a system state is invisible. This causes a problem in that it is difficult for the user to know the system state. In addition, it is difficult for the user to understand what type of function is executable depending on the system state.

For example, there is a case in which, when surplus capability satisfies predetermined conditions in a virtual information processing apparatus, a functional program set beforehand needs to be activated. For this case, it has been performed to execute a predetermined program in an information processing apparatus in response to the activation of a predetermined system state. However, there is no technique for freely and easily changing start conditions on the program at this time.

For example, a sales promotion method (see, for example, Japanese Unexamined Patent Application Publication No. 2003-316994) has been proposed in which a store manager can freely set point-giving conditions or event-achieving conditions and a customer can freely know details of the setting. The setting of conditions in the above method is specialized only in a simple fixed event, and conditions concerning varying status such as a change in information-processing-apparatus state are not considered.

In addition, a broadcasting system (see, for example, Japanese Unexamined Patent Application Publication No. 10-75219) has been proposed in which, when a program is broadcasted from a center, by adding an attribute to the program in the broadcasting, a receiving terminal can be selected for the broadcast program. Furthermore, an attribute information utilizing system (see, for example, Japanese Unexamined Patent Application Publication No. 2003-223590) in which a network service can be utilized in various forms has been proposed. However, each of the above examples is dependent on only attribute information, and a varying change in state is not considered.

SUMMARY

It is desirable to provide an information processing system and information processing method in which a plurality of network-connected apparatuses cooperatively operate to perform distributed processing, whereby they suitably operates as a virtual information processing apparatus, and a computer program used with the system and method.

It is further desirable to provide an information processing system and information processing method that execute a predetermined function by utilizing the surplus processing capability of a virtual apparatus including a plurality of network-connected apparatuses, and a computer program used with the system and method.

It is further desirable to provide an information processing system and information processing method that automatically start and execute a function in accordance with a system state which varies depending on surplus processing capability of a virtual apparatus including a plurality of network-connected apparatuses and a connecting state of the apparatuses, and a computer program used with the system and method.

According to an embodiment of the present invention, there is provided an information processing system including a plurality of information processing apparatuses connected to a network, the information processing apparatuses being mutually linked to operate as a virtual information processing apparatus, the information processing system including a monitoring means for monitoring the system state of the virtual information processing apparatus which includes the surplus capability of the virtual information processing apparatus and the configuration of the information processing apparatuses connected to the network, a start-condition setting means for setting a relationship between the system state of the virtual information processing apparatus and an executable function, a function executing means which, when the system state satisfies predetermined start conditions, executes a corresponding function, and a function-utilization-history-information storing means for storing utilization history information obtained when the corresponding function is executed by the function executing means.

The above term "system" means a logical set of plural apparatuses (or functional modules that realize specific functions), and particularly has no relationship with a state in which the apparatuses and functional modules are located in a single housing.

The present invention relates to grid-computing technology. In an embodiment of the present invention, a plurality of information processing apparatuses on a network are mutually linked to perform distributed processing, whereby, for a user, they can operate as a virtual information processing apparatus. According to such a virtual information processing apparatus, even if it is difficult for only the hardware resources and processing capability of a single information processing apparatus to cope with a request from a user, by utilizing the surplus processing capability of another information processing apparatus which cooperatively operates, with it linked to a network, the virtual information processing apparatus can meet the user's request, and, in addition, a service that is not actual with a normal information processing apparatus can be realized.

Functions that can be realized by the virtual information processing apparatus vary depending on a system state including the types and number of network-connected apparatuses, and the surplus processing capability of each apparatus. Since the information processing apparatuses, which are linked to operate, are scattered in a physical space through the network, the system state is invisible, so that it is difficult for the user to know the system state. In addition, it is difficult for the user to understand, for selection, what type of function is executable depending on the system state, or what type of function needs to be executed.

According to an embodiment of the present invention, when a system state that includes the surplus processing capability of a virtual information processing apparatus and a connecting state of apparatuses satisfies predetermined start conditions, a functional program set beforehand can be selectively started. In addition, by providing means for freely and easily changing the start conditions, user's convenience can be enhanced.

In an information processing system according to an embodiment of the present invention, regarding data that can be recorded as a history, such as a type of a functional program, a date and time of execution, load factors, surplus capability, a connected apparatus, and user information, based on utilization-history-storage setting information, specified data items are stored as utilization history information in an external storage device in an information processing apparatus.

In addition, by providing an information providing server on a network, start-condition setting information, software and data for use in function starting, utilization-history-storage setting information, etc., can be acquired from the information providing server with predetermined timing.

Furthermore, by providing an information collecting server on the network, utilization history information is sent to the information collecting server with predetermined timing. Based on the collected utilization history information, the information collecting server generates statistical information of utilization that includes a type of combination of information processing apparatuses, a type of a functional program used, and a frequency of utilization of the functional program. Based on the statistical information of utilization, function-selecting information in accordance with environments for each user can be generated.

According to another embodiment of the present invention, there is provided a computer program in computer-readable form for allowing a computer system to execute processing in which a plurality of information processing apparatuses connected to a network are mutually linked to operate as a virtual information processing apparatus, the computer program including the steps of monitoring the system state of the virtual information processing apparatus which includes the surplus capability of the virtual information processing apparatus and the configuration of the information processing apparatuses connected to the network, setting a relationship between the system state of the virtual information processing apparatus and an executable function, when the system state satisfies predetermined start conditions, executing a corresponding function, and storing utilization history information obtained when the corresponding function is executed in the step of executing the corresponding function.

The computer program according to the above embodiment of the present invention defines a computer program described in computer-readable form so as to implement predetermined processing in a computer system. In other words, by installing the computer program according to the above embodiment of the present invention into a computer system, the computer system has cooperative operation, whereby operation and advantages similar to those in the information processing system according to the above embodiment of the present invention can be obtained.

According to an embodiment of the present invention, a superior information processing system in which a plurality of network-connected apparatuses can suitably operate as a virtual apparatus in such a form that they cooperatively operate to perform distributed processing, an information processing method used therefor, and a computer program used therewith are provided.

According to an embodiment of the present invention, a superior information processing system in which a predetermined function can be executed by utilizing the surplus processing capability of a virtual information processing apparatus including network-connected apparatuses, an information processing method used therefor, and a computer program used therewith are provided.

According to an embodiment of the present invention, a superior information processing apparatus that implements a function in accordance with a system state that varies depending on the surplus processing capability of a virtual information processing apparatus including a plurality of network-connected apparatuses and a connecting state of the apparatuses, an information processing method used therefor, and a computer program used therewith are provided.

According to an embodiment of the present invention, for the need to cause a set functional program to operate only when a particular information processing apparatus is connected and the surplus capability of the virtual information processing apparatus satisfies certain conditions, the start conditions can be freely and easily set to realize the need.

Furthermore, at the same time, by collecting user's utilization condition and performing statistical processing the collected condition, statistical information of utilization can be generated which includes a type of combination of information processing apparatuses, a type of functional program used, and a frequency of utilization of the functional program. The thus obtained statistical information can be returned to the user, and information of a highly convenient method of utilization can be provided. For example, by further generating function-selecting information from the statistical information, and, based on the generated information, updating items of start-condition setting information and utilization-history-storage setting information, service contents concerning the start of the functional program can enhanced, thus improving user's convenience.

Additional features and advantages of the present invention are described in, and will be apparent from, the following Detailed Description and the figures.

BRIEF DESCRIPTION OF THE FIGURES

FIGS. 2A, 2B, and 2C are illustrations of accessing a main memory 24 by a sub-processor 23.

FIG. 5 is a block diagram showing a state in which a plurality of information processing apparatuses operate as a virtual information processing apparatus.

FIG. 7 is a block diagram showing a state in which four information processing apparatuses operate as a virtual information processing apparatus.

FIG. 10 is a block diagram showing the configuration of the hard disk recorder shown in FIG. 9.

DETAILED DESCRIPTION

Details of embodiments of the present invention are described below with reference to the accompanying drawings.

A. System Configuration

In an embodiment of the present invention, by suitably linking the operation of at least two information processing apparatuses via a home network, a recording reserving operation in each apparatus, which is installed in a different place, is facilitated and made more efficient. In order to link apparatuses on a network, grid computing technology for realizing high calculation performance by cooperative operation of apparatuses is utilized.

Figure 1:
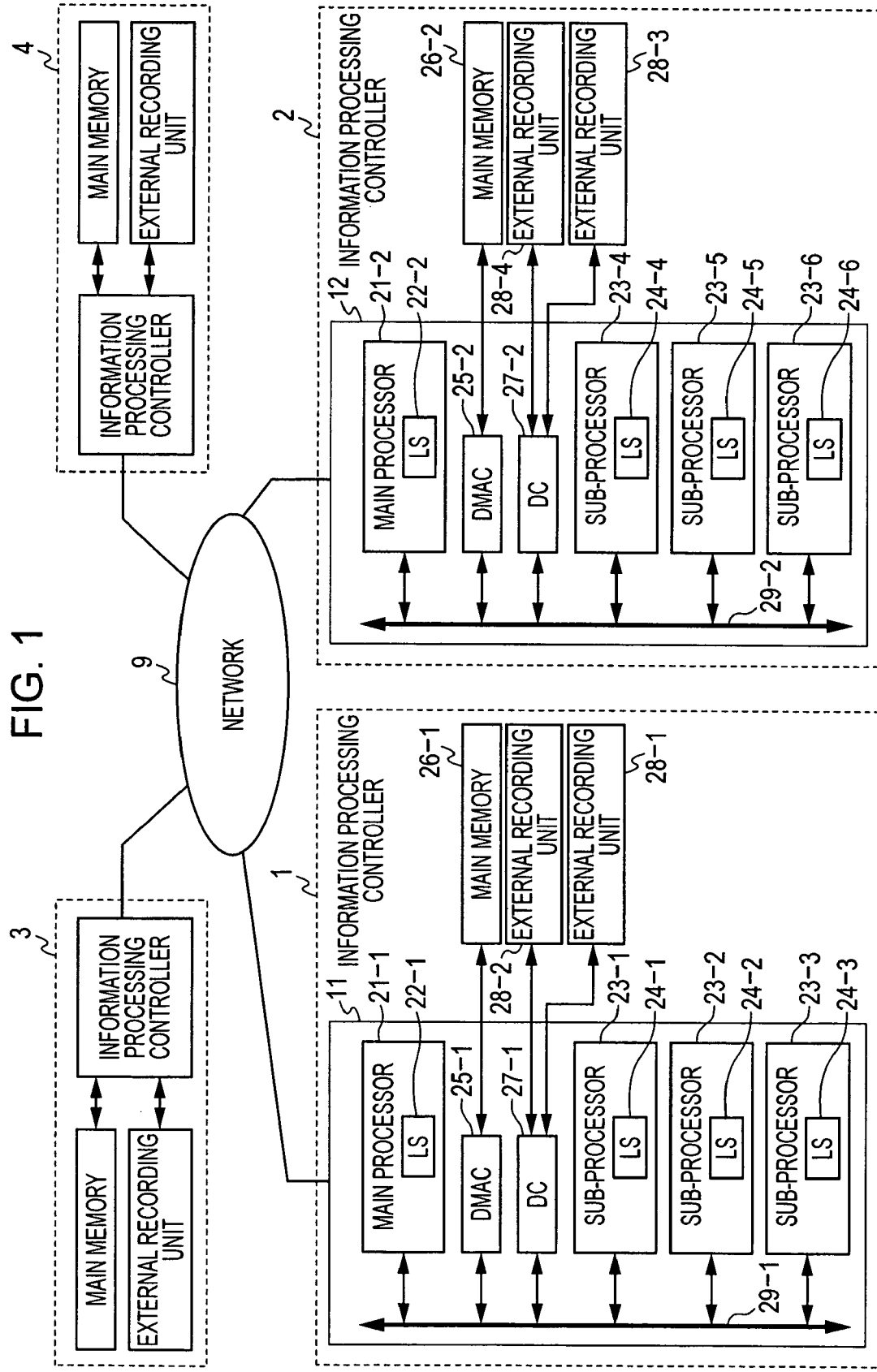
FIG. 1 is a block diagram showing the configuration of a network system according to an embodiment of the present invention.

FIG. 1 shows the schematic configuration of a network system formed by applying grid computing.

The shown network is the Internet or a wide area network. The wide area network is formed by a private network such as a LAN connected via a gateway, or a home network. The home network can be physically formed by a standard network interface such as 10BASE-T, 100BASE-TX, or Giga Ethernet. In addition, as a mechanism for one apparatus to detect another, UPnP (Universal Plug&Play) can be used. According to UPnP, network-connected apparatuses exchange definition files described in XML (eXtensible Markup Language) form, and perform mutual authentication after performing an addressing process, a discovering process, and a service requesting process. Alternatively, also by broadcasting packets describing predetermined apparatus information in the same segment, the above processes can be realized.

A plurality of information processing apparatuses are connected to a network. Examples of the information processing apparatuses include AV apparatuses, such as DVD recorders and HD recorders, having recording media loaded therein and recording reservation functions, playback-only AV apparatuses, such as compact disc players, having no recording functions, or information processing apparatuses of another type. In addition, other examples of the information processing apparatuses include calculation processing systems such as PDAs and personal computers. In the case shown in FIG. 1, a plurality of information processing apparatuses 1, 2, 3, and 4 are connected to one another by a network 9.

A-1. Information Processing Apparatus and Information Processing Controller

The information processing apparatuses 1, 2, 3, and 4 are, for example, AV apparatuses and portable apparatuses (described later) of various types.

As shown in FIG. 1, the information processing apparatus 1 includes an information processing controller 11 as a computer function unit. The information processing controller 11 includes a main processor 21-1, sub-processors 23-1, 23-2, and 23-3, a direct memory access controller (DMAC) 25-1, and a disc controller (DC) 27-1. It is preferable that the information processing controller 11 be formed as a single-chip integrated circuit (IC).

The main processor 21-1 performs schedule management of program execution (data processing) by the sub-processors 23-1, 23-2, and 23-3, and overall management of the information processing controller 11 (the information processing apparatus 1). However, the main processor 21-1 can be formed so that a program other than a program for management therein can operate. In this case, the main processor 21-1 also functions as a sub-processor. The main processor 21-1 includes a local storage (LS) 22-1.

Although the number of sub-processors in one information processing apparatus may be one, it is preferably plural. The case shown in FIG. 1 shows that the number of sub-processors is plural. Under the control of the main processor 21-1, the sub-processors 23-1, 23-2, and 23-3 execute programs in parallel and independently to process data. In addition, depending on circumstances, a program in the main processor 21-1 can operate, with it linked to a program in each of the sub-processors 23-1, 23-2, and 23-3. The sub-processors 23-1, 23-2, and 23-3 also include LSs 24-1, 24-2, 24-3.

The DMAC 25-1 can access programs and data stored in a main memory 26-1 including a dynamic RAM (DRAM) connected to the information processing controller 11 without using any processor. The DC 27-1 controls the operation of accessing external recording units 28-1 and 28-2 connected to the information processing controller 11.

The external recording units 28-1 and 28-2 may have any of a fixed disk (hard disks) form and a removable disk form. In addition, as removable disks, various types of recording media, such as magneto-optical discs, optical discs such as CD±RW and DVD±RW, memory disks, static RAMs (SRAM), and ROMs, can be used. The DC 27-1 is a disk controller, and is, in short, an external recording unit controller. As shown in FIG. 1, the information processing controller 11 can be formed so as to connect to a plural number of external recording units 28.

The main processor 21-1, the sub-processors 23-1, 23-2, and 23-3, the DMAC 25-1, and the DC 27-1 are connected to one another by a bus 29-1.

An identifier that can uniquely identify, in the entirety of the network, one information recording apparatus 1 including an information processing controller 11 is assigned as information processing apparatus ID to the information processing controller 11. In addition, identifiers for identification are similarly assigned as main processor ID and sub-processor ID to the main processor 21-1 and the sub-processors 23-1, 23-2, and 23-3.

Other information processing apparatuses 2, 3, and 4 are not described here since there have similar configurations. Here, units denoted by reference numerals whose main-parts are identical identically function unless otherwise noted, even if the sub-parts of the reference numerals differ. In addition, in the following description, when sub-parts of reference numerals are omitted, a difference in sub-part does not cause any difference.

A-2. Accessing of Main Memory by Each Sub-Processor

As described above, each sub-processor 23 in one information processing controller 11 processes data by separately executing a program. When different sub-processors simultaneously read or write data in the same area of the main memory 26, inconsistency of data can occur. Accordingly, access from the sub-processor 23 to the main-memory 26 is performed in the following process.

FIG. 2A shows locations in the main-memory 26. As shown in FIG. 2A, the main-memory 26 includes memory locations designating a plurality of addresses. Additional segments for storing data status information are assigned to the memory locations. Each additional segment includes an F/E bit, sub-processor ID, and an LS (local storage) address. In addition, an access key (described later) is assigned to each memory location. The F/E bit is defined as described below.

When the F/E bit=0, this value indicates that it is difficult to read stored data since the data is in process and is being read, or the data is invalid data that is not the latest data due to a free state. In addition, when the F/E bit=0, it is indicated that data can be written in the memory location. After the data is written, the F/E bit is set to 1.

When the F/E bit=1, this value indicates that data in the memory location has not been read by the sub-processor 23 and is the latest data that is unprocessed. The data in the memory location is readable and is set to zero after being read by the sub-processor 23. In addition, when the F/E bit=1, the value indicates that data writing in the memory location is not allowed.

In addition, in the above state in which the F/E bit=0 (inability to read data/ability to write data), reservation of reading from the memory location can be set. When reservation of reading is set for a memory location in which its F/E bit=0, the sub-processor 23 writes, in an additional segment of the memory location for which reading is reserved, as reading reservation information, the sub-processor ID and LS address of the sub-processor 23.

After that, when one sub-processor 23, which reads data, writes data in the memory location for which reading is reserved, and sets the memory location so that the F/E bit=1 (ability to read data/inability to write data), the data is read correspondingly to the sub-processor ID and LS address written beforehand as reading reservation information in the additional segment.

When it is necessary to process data in plural stages by using a plurality of sub-processors, as described above, by controlling reading/writing of data in each memory location, immediately after the sub-processor 23, which performs pre-processing, writes processed data at a predetermined address in the main-memory 26, another sub-processor 23, which performs post-processing, can read the pre-processed data.

In addition, FIG. 2B shows memory locations in an LS 24 in each sub-processor 23. As shown in FIG. 2B, the LS 24 in the sub-processor 23 includes memory locations that can designate a plurality of addresses. Similarly, additional segments are assigned to the memory locations. Each additional segment includes a busy bit.

When the sub-processor 23 loads data in the main-memory 26 into a memory location of the LS 24 of itself, it sets a corresponding busy bit to one for reservation. In a memory location having a busy bit of one, storing of other data is not allowed. After the data is loaded into the memory location of the LS 24, the busy bit is set to zero, so that the memory location can be used for an arbitrary purpose.

As shown in FIG. 2A, the main-memory 26, which is connected to each information processing controller, includes a plurality of sandboxes defining areas in the main-memory 26. The main-memory 26 includes a plurality of memory locations and the sandboxes are sets of the memory locations. Each sandbox is assigned for each sub-processor 23, and the corresponding sub-processor can exclusively use the sandbox. In other words, although each sub-processor 23 can use a sandbox assigned to itself, it is unable to access data beyond this area.

Furthermore, to realize exclusive control of the main-memory 26, the key management table shown in FIG. 2C is used. The key management table is stored in a relatively high-speed memory such as an SRAM in the information processing controller and is associated with the DMAC 25. Each entry of the key management table includes a sub-processor key and a key mask.

A process in which the sub-processor 23 uses the main-memory 26 is as follows. At first, the sub-processor 23 outputs a reading or writing command to the DMAC 25. This command includes the sub-processor ID of the sub-processor 23 and an address in the main-memory 26, whose use is requested.

The DMAC 25 refers to the key management table before executing this command and checks the sub-processor key of the sub-processor 23, which requests the use of the DMAC 25. Next, the DMAC 25 compares the checked sub-processor key of the sub-processor 23, which requests the use of the DMAC 25, and an access key assigned to a memory location (in FIG. 2A) in the main-memory 26, whose use is requested. Only when two keys match each other does the DMAC 25 execute the above command.

Regarding each key mask on the key management table shown in FIG. 2C, an arbitrary bit of the key mask is set to one, whereby a corresponding bit of the sub-processor associated with the key mask can be set to zero or one.

For example, it is assumed that a sub-processor key is 1010. Normally, by using this sub-processor key, a sandbox having an access key of 1010 can be only accessed. However, when a key mask associated with this sub-processor key is set to 0001, for only a digit in which the bit of the key mask is set to one, determination of coincidence between the sub-processor key and the access key is masked, and, by using this sub-processor key of 1010, a sandbox having an access key of 1010 or 1011 can be accessed.

As described above, exclusivity of the sandboxes in the main-memory 26 is realized. In other words, when it is necessary to process data in plural stages by using a plurality of sub-processors in one information processing controller, only one sub-processor, which performs pre-processing, and one sub-processor, which performs post-processing, can access a predetermined address in the main-memory 26, whereby data can be protected.

This exclusive memory control can be used, for example, as follows. In the beginning, immediately after the information processing apparatus starts, the values of key masks are all zeroes. A program in the main processor 21 is executed to operate in a form linked to a program in the sub-processor 23. When it is necessary to perform temporarily storing, in the main memory 26, processed data output from a first sub-processor, and inputting the processed data to a second sub-processor, a corresponding main memory area naturally needs to be capable of being accessed by either sub-processor. In this case, by changing the value of the key mask to an appropriate value, and providing a main memory area capable of being accessed by a plurality of sub-processors 26, the program in the main memory 26 enables multistage sub-processor processing.

More specifically, when multistage processing is performed in a process that performs receiving data from another information processing apparatus, processing by the first sub-processor, using a first main memory area, processing by a second sub-processor, and using a second main memory area, it is difficult for the second sub-processor to access the first main memory area, with the following settings unchanged:

the sub-processor key of the first sub-processor: 0100;
the access key of the first main memory area: 0100;
the sub-processor key of the second sub-processor: 0101; and
the access key of the second main memory area: 0101.

Accordingly, by setting the key mask of the second sub-processor to 0001, the second sub-processor is enabled to access the first main memory area.

A-3. Generation and Configuration of Software Cell

In the network system shown in FIG. 1, for distributed processing by the information processing apparatuses 1, 2, 3, and 4, software cells are transmitted among them. In other words, the main processor 21 included in an information processing controller in one information processing apparatus can distribute processing by generating software cells including commands, programs, and data, and transmitting the cells to other information processing apparatuses via the network.

Figure 3:
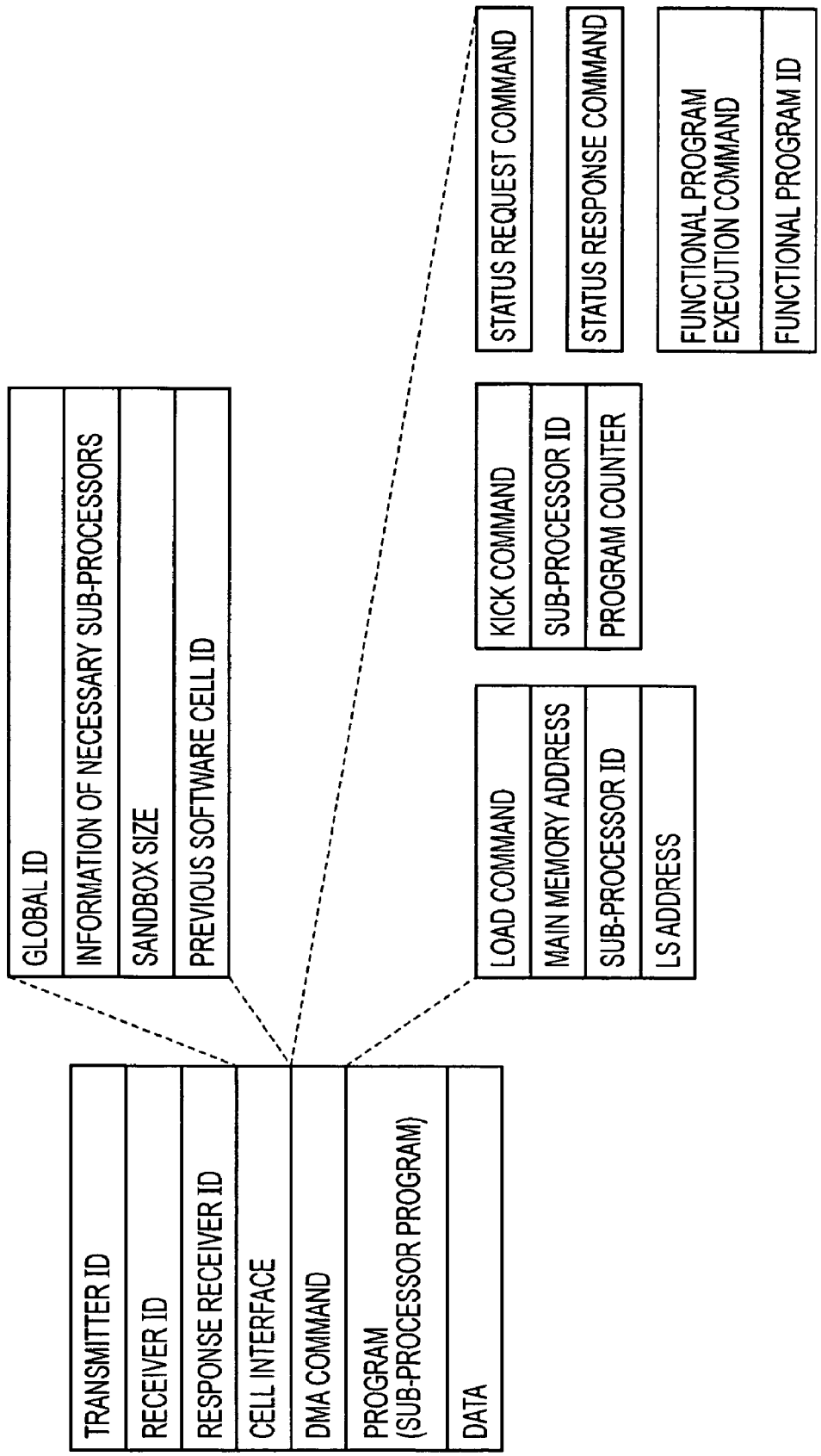
FIG. 3 is an illustration of an example of the configuration of a software cell.

FIG. 3 shows an example of the configuration of a software cell. The shown software cell includes a transmitter ID, a receiver ID, a response receiver ID, a cell interface, a DMA command, a program, and data.

The transmitter ID includes the network address of an information processing apparatus, which transmits the software cell, the information processing apparatus ID of an information processing controller in the information processing apparatus, and the identifiers (a main processor ID and a sub-processor ID) of a main processor and each sub-processor 23 in the information processing controller in the information processing apparatus.

Each of the receiver ID and the response receiver ID includes similar information concerning an information processing apparatus, which receives the software cell, and an information processing apparatus, which receives a response of the result of executing the software cell.

The cell interface is information necessary for using the software cell, and includes a global ID, necessary sub-processor information, a sandbox size, and a previous software cell ID.

The global ID uniquely identifies the software cell in the entirety of the network, and is created based on the transmitter ID and the date and time of creation or transmission of the software cell.

In the necessary sub-processor information, the number of sub-processors necessary for executing the software cell is set. In the sandbox size, the memory sizes of the main memory 26 and the LS 24 in the sub-processor 23, which are necessary for executing the software cell, are set.

The previous software cell ID is the identifier of a previous software cell in a group of software cells that request sequential execution of streaming data or the like.

An execution section for the software cell includes DMA commands, a program, and data. The DMA commands include a series of DMA commands necessary for starting a program. The program includes a sub-processor program to be executed by the sub-processor 23. The above data is to be processed by a program including the sub-processor program.

In addition, the DMA commands include a load command, a kick command, a functional program execution command, a status request command, and a status response command.

The load command is used to load information in the main memory 26 into the LS 24 in the sub-processor 23, and has a main memory address, a sub-processor ID, and an LS address. The main memory address represents the address of a predetermined area in the main memory 26, from which the information is loaded. The sub-processor ID and the LS address represent the identifier of the sub-processor 23, from which the information is loaded, and an address in the LS 24, respectively.

The kick command is used to initiate program execution, and has a sub-processor ID and a program counter. The sub-processor ID identifies the sub-processor 23 to be kicked, and the program counter gives an address for a program-executing program counter.

The functional program execution command is a command (described later) by which an information processing apparatus requests another information processing apparatus to execute a functional program. Based on a functional program ID (described later), an information processing controller in an information processing apparatus, which receives the functional program execution command, identifies a functional program to be started.

The status response command is used to request transmission of apparatus information concerning the present state (status) of an information processing apparatus designated by the transmitter ID to an information processing apparatus designated by the response receiver ID. The functional program is described later. It is categorized into functional programs in the configuration (shown in FIGS. 6A, 6B, and 6C) of software stored in the main memory 26 in the information processing controller. The functional program is loaded into the main memory 26 and is executed by the main processor 21.

The status response command is a command by which an information processing apparatus, which receives the status request command, responds with its apparatus information to the information processing apparatus designated by a response receiver ID included in the status request command. The status response command is used to store the apparatus information in a data area in the execution section.

Figure 4:
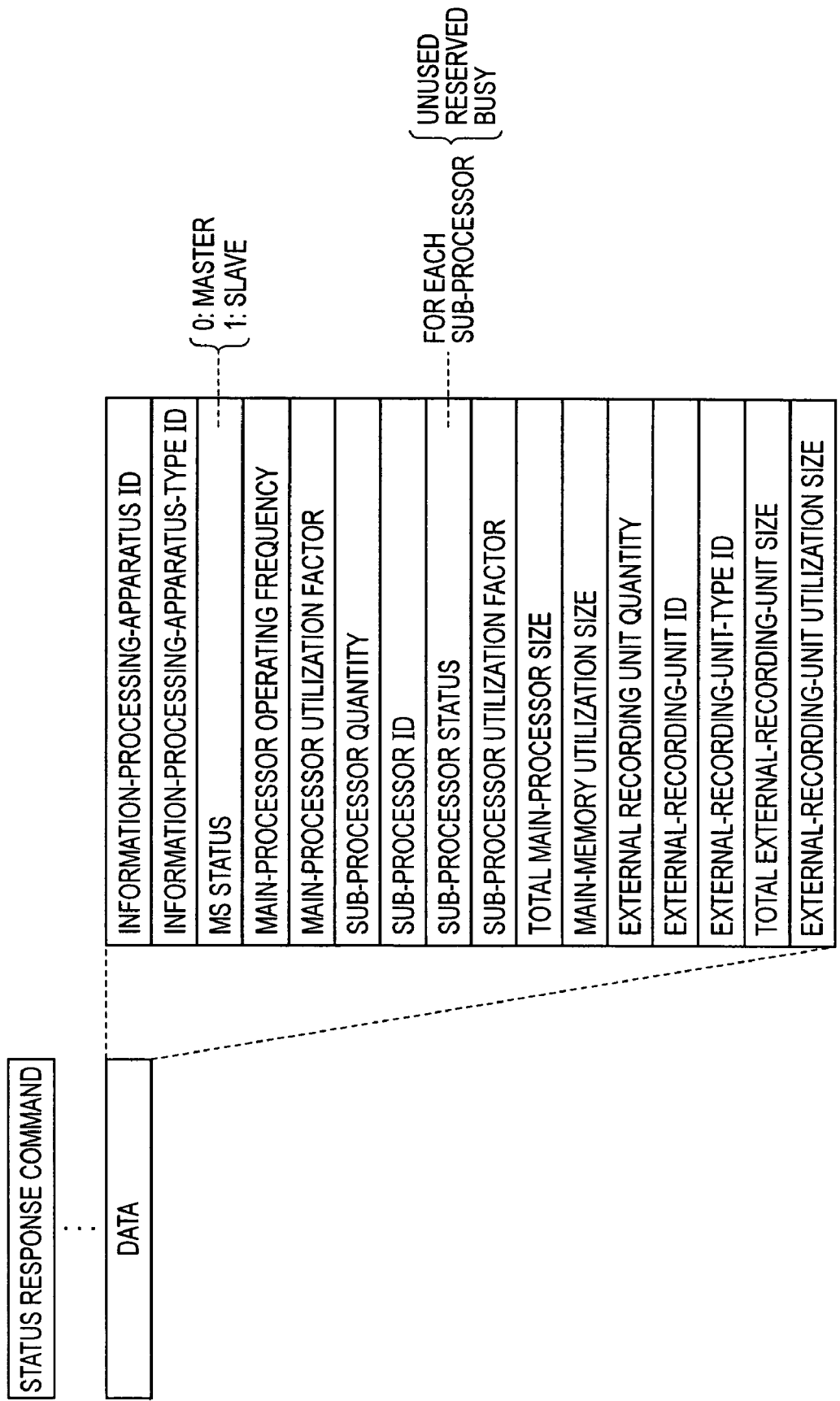
FIG. 4 is an illustration of a data area of a software cell when a DMA command is a status response command.

FIG. 4 shows the structure of a data area in the software cell when a DMA command is a status response command.

The information processing apparatus ID is an identifier for identifying an information processing apparatus including an information processing controller, and represents the ID of an information processing apparatus, which transmits a status response command. In a power supply mode, the information processing apparatus ID is generated by a main processor 21 included in an information processing controller in the information processing apparatus based on the date and time of the power supply mode, the network address of the information processing apparatus, and the number of sub-processors 23 included in the information processing controller in the information processing apparatus.

An information-processing-apparatus-type ID includes a value representing a feature of the information processing apparatus. The mentioned feature of the information processing apparatus is, for example, a hard disk recorder (described later), a personal digital assistant (PDA), a portable CD (compact disc) player, or the like. In addition, the information-processing-apparatus-type ID may be one that represents a function of the information processing apparatus, such as audio/video recording, audio/video playback, or the like. The value that represents a feature or function of the information processing apparatus is predetermined. By calling an information-processing-apparatus-type ID, the feature and function of the information processing apparatus can be grasped.

An MS (master/slave) status indicates in which of master and slave apparatus modes the information processing apparatus operates, as described above. When the MS status is set to zero, it is indicated that the information processing apparatus operates as a master apparatus. When the MS status is set to one, it is indicated that the information processing apparatus operates as a slave apparatus.

A main-processor operating frequency represents the operating frequency of the main processor 21 in the information processing controller. A main-processor utilization factor represents a rate at which all presently operating programs are used in the main processor 21. The main-processor utilization factor is a value representing a ratio of processing capability in use to the entire processing capability of a corresponding main processor. The main-processor utilization factor is calculated in MIPS (million instructions per second) that is a unit for evaluating processor processing capability, or is calculated based on a processor usage time per unit time. This also applies to a sub-processor utilization factor (described later).

The number of sub-processors represents the number of sub-processors 23 in the information processing controller. A sub-processor ID is an identifier for identifying each sub-processor 23 in the information processing controller.

A sub-processor status represents the status of each sub-processor 23, and the sub-processor 23 has unused, reserved, and busy statuses, etc. The unused status indicates that the sub-processor is not presently used and is not reserved for use. The reserved status indicates that the sub-processor is not presently used and is reserved. The busy status indicates that the sub-processor is presently used.

A sub-processor utilization factor represents a rate at which a program being presently used in the sub-processor, or a program reserved for execution in the sub-processor is used. In other words, the sub-processor utilization factor represents the present utilization factor when the sub-processor status is busy, and represents an estimated utilization factor (of later use of the sub-processor) when the sub-processor status is reserved.

For one sub-processor 23, a set of a sub-processor ID, a sub-processor status, and a sub-processor utilization factor is set, and the number thereof is set for as many as the number of sub-processors 23 in one information processing controller.

A total main memory size and a memory utilization size represent the total size of the main memory 26, which is connected to the information processing controller, and a size of the main memory 26 which is presently used, respectively.

An external recording unit quantity represents the number of external recording units 28 connected to the information processing controller. An external recording unit ID is information that uniquely identifies one external recording unit 28, which is connected to the information processing controller. An external-recording-unit-type ID represents the type (e.g., a hard disk, CD±RW, DVD±RW, a memory disk, SRAM, ROM, or the like) of the external recording unit 28.

A total external-recording-unit size and an external-recording-unit utilization size represent the total size of an external recording unit 28 identified by the external-recording-unit ID, and the size of the external recording unit 28 which is presently used, respectively.

For one external recording unit 28, a set of an external recording unit ID, an external-recording-unit-type ID, a total external-recording-unit size, and an external-recording-unit utilization size is set, and the number thereof is set for as many as the number of the external recording units 28 connected to the information processing controller. In other words, when the external recording units 28 are connected to one information processing controller, different external recording unit IDs are assigned to them, and also external-recording-unit-type IDs, total external-recording-unit sizes, and external-recording-unit utilization sizes are separately managed.

A-4. Execution of Software Cell

The main processor 21 included in an information processing controller in one information processing apparatus generates a software cell having the above-described configuration, and transmits the software cell to another information processing controller and an information processing controller in the apparatus through the network. An information processing apparatus, which transmits the software cell, an information processing apparatus, which receives the software cell, an information processing apparatus, which receives a response, and an information processing controller in each apparatus are respectively identified based on the above transmitter ID, receiver ID, and response receiver ID.

The main processor 21 included in the information processing controller in an information processing apparatus, which receives a software cell, stores the software cell in the main memory 26. In addition, the main processor 21 in an information processing apparatus, which is a receiver, reads the software cell, and processes a DMA command included in the software cell.

Specifically, at first, the main processor 21 in the information processing apparatus, which is a receiver, executes a load command. This loads information from a main memory address specified by the load command into a predetermined area in the LS 24 specified by a sub-processor ID and LS address included in the load command. The information loaded here is a sub-processor program or data included in the received software cell, or other data specified.

Next, the main processor 21 outputs a kick command to a sub-processor specified by sub-processor ID included in the kick command together with a program counter similarly included in the kick command.

The specified sub-processor executes the sub-processor program in accordance with the kick command and the program counter. After storing the result of execution in the main memory 26, the sub-processor notifies the main processor 21 of completion of the execution.

A processor that executes a software cell in an information processing controller in an information processing apparatus, which is a receiver, is not limited to the sub-processor 23, but the main processor 21 can be instructed to execute a main memory program such as a functional program included in the software cell.

In this case, an information processing apparatus, which is a transmitter, transmits, to an information processing apparatus, which is a receiver, a software cell which includes a main memory program and data to be processed by the main memory program, and in which a DMA command is a load command, instead of a sub-processor program. The information processing apparatus, which is a transmitter, stores, in the main memory 26, the main memory program and the data to be processed thereby.

Next, the information processing apparatus as the transmitter, transmits, to the information processing apparatus as the receiver, a software cell which includes a main processor ID concerning the information processing controller in the information processing apparatus as the transmitter, a main memory address, an identifier such as a functional program ID (described later) for identifying the main memory program, and a program counter, and in which a DMA command is a kick command or a functional program execution command, and controls the main processor 21 to execute the main memory program.

As described above, in a network system according to this embodiment, an information processing apparatus as a transmitter transmits, to an information processing apparatus as a receiver, in the form of a software cell, a sub-processor program or main memory program, and controls the sub-processor 23 included in an information processing controller in the information processing apparatus as the receiver to load the sub-processor program, whereby the sub-processor program or the main memory program can be executed by the information processing apparatus as the transmitter.

When the program included in the received software cell is a sub-processor program, the information processing controller in the information processing apparatus as the transmitter controls a sub-processor to load the sub-processor program. In addition, it controls the sub-processor to execute the sub-processor program or main memory program included in the software cell.

Accordingly, in the information processing controller in the information processing apparatus as the receiver, the sub-processor program or main memory program can be automatically executed without operating by the user the information processing apparatus as the receiver.

As described above, when, in an information processing apparatus, its information processing controller includes no main memory program such as a sub-processor program or functional program, the information processing apparatus can acquires the main memory program. In addition, DMA data transfer is performed between sub-processors and the above-described sandboxes are used, whereby, even if it is necessary for one information processing controller to process data in plural stages, the processing can be executed at high speed and with high security.

A-5. Distributed Processing in the Form of Network System

FIG. 5 shows a state in which a plurality of information processing apparatuses operate as one virtual information processing apparatus. As the result of distributed processing by using software cells, as shown in an upper part of FIG. 5, a plurality of information processing apparatuses 1, 2, 3, and 4 that are connected to a network 9 operate as one virtual information processing apparatus 7, as shown in a lower part of FIG. 5. However, to realize the above virtual operation, the following processing needs to be executed in the following configuration.

A-6. Software Configuration of System and Loading of Programs

Figure 6A:
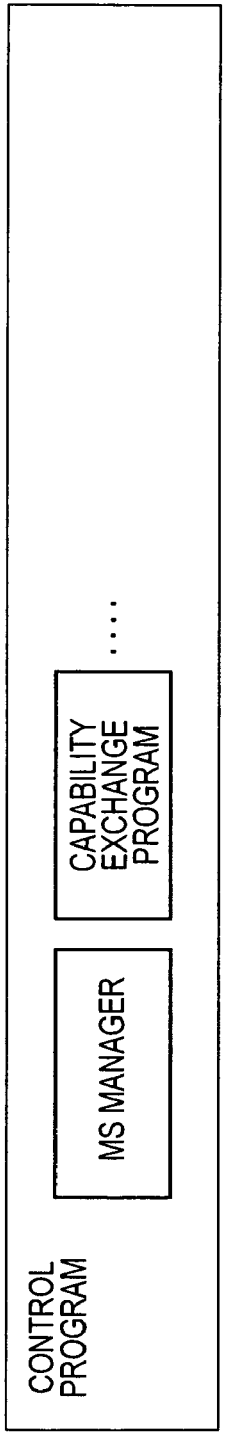
FIGS. 6A, 6B, and 6C are illustrations of an example of the software configuration of an information processing controller.
Figure 6B:
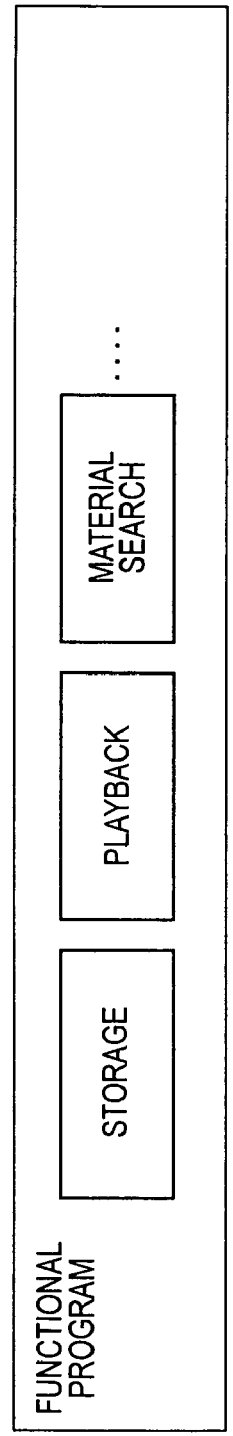
Figure 6C:
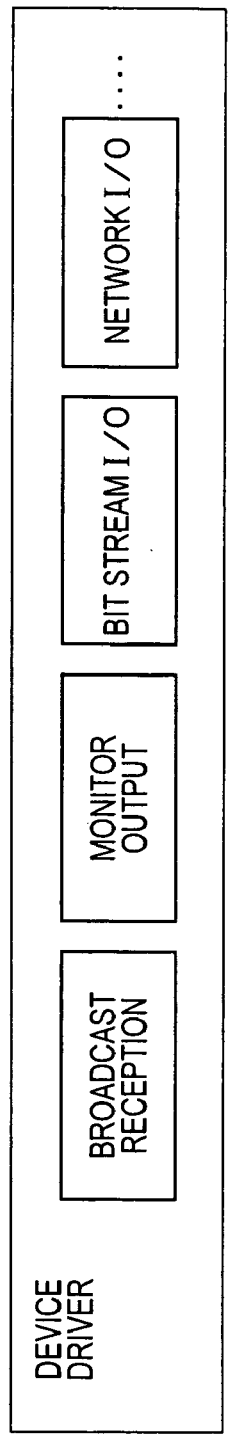

FIGS. 6A, 6B, and 6C show the configuration of software stored in the main memory 26 in each information processing controller. The software (programs) are recorded in the external recording unit 28 connected to the information processing controller before power is supplied to the information processing apparatus. The programs are classified by function or feature into control programs, functional programs, and device programs.

The information processing apparatuses have the same control programs, and the control programs are executed by the main processor 21 in each information processing controller and include a master/slave (MS) manager and a capability exchange program, which are described later.

The functional programs are executed by the main processor 21. Each information processing controller has functional programs which match the information processing controller and which are used for recording, playback, material search, etc.

The device drivers are used for input/output (transmission/reception) for the information processing controller (information processing apparatus). Each information processing controller includes device drivers for broadcast reception, monitor output, bit stream input/output, network input/output, etc., which match the information processing apparatus.

In a state in which an information processing apparatus is physically connected to the network 9 by cable plugging or the like, by supplying main power to the information processing apparatus and electrically and functionally connecting the information processing apparatus to the network 9, the main processor 21 in the information processing controller in the information processing apparatus loads, into the main memory 26, programs belonging to the control programs and programs belonging to the device drivers.

In a program loading process, at first, the main processor 21 reads programs from the external recording unit 28 by controlling the DC 27 to execute a reading command, and next writes the programs in the main memory 26 by controlling the DMAC 25 to execute a writing command.

Regarding the programs belonging to the functional programs, only a necessary program may be loaded into the main memory 26 when needed. Alternatively, similarly to programs belonging to other categories, each program may be loaded immediately after supplying main power.

It is not necessary for each program belonging to the functional programs to be recorded in the external recording units 28 in all the information processing apparatuses 1 to 4 connected to the network 9. If the program is recorded in the external recording unit 28 in any one of the information processing apparatuses 1 to 4, it can be loaded from another information processing apparatus. As a result, as shown in the lower part of FIG. 5, the information processing apparatuses 1 to 4 can execute the functional programs in the form of the virtual information processing apparatus 7.

As described above, the functional programs processed by the main processor 21 may operate in a form linked to the sub-processors processed by the sub-processor 23. Accordingly, the main processor 21 reads a functional program from the external recording unit 28, and, when there is a sub-processor program that operates in a form linked to the functional program, which is to be written in the main memory 26, the sub-processor program is also written in the main memory 26. In this case, the number of sub-processor programs that operate in linked form may be one or plural. When the number of sub-processor programs is plural, all sub-processor programs that operate in linked form are written in the main memory 26. After that, the sub-processor programs written in the main memory 26 are written in the LS 24 in the sub-processor 23, and operate in a form linked to the functional programs processed by the main processor 21.

Sub-processor program IDs are also assigned to the sub-processor programs. This enables unique identification of the sub-processor programs. An assigned sub-processor program ID may be an identifier that is related to the functional program ID of a functional program to which the sub-processor program is liked in operation, for example, an identifier in which the functional program ID is used as a main number and a sub-number is added to the end of the main number. Alternatively, the assigned number may be an identifier that is not related to the functional program ID of the functional program to which the sub-processor program is liked in operation. In any case, when a functional program and a sub-processor program operate, with both linked to each other, both need to store a program ID as the identifier of each. Also when a functional program operates in a form linked to a plurality of sub-processor programs, the functional program stores the sub-processor program IDs of all the sub-processor programs.

As indicated by the software cell in FIG. 3, an identifier capable of uniquely identifying each program is assigned as a functional program ID to a functional program. The functional program ID is determined, in a functional program creating stage, based on the data and time of creation and an information processing apparatus ID.

The main processor 21 reserves, in the main memory 26, an area for storing apparatus information (operating-state information) of the information processing apparatus, in which the main processor 21 operates, and records the operation status information as an apparatus-information table of the information processing apparatus. The above operating-state information is information, such as an information processing apparatus ID, in a data area of the status response command shown in FIG. 4.

A-7. Determination of Master/Slave in System

In the above-described network system, when main power is supplied to one information processing apparatus, the main processor 21 in the information processing controller of the information processing apparatus loads a master/slave (MS) manager into the main memory 26 and executes the loaded manager.

When detecting that an information processing apparatus in which the MS manager operates establishes connection to the network 9, the MS manager confirms the existence of other information processing apparatuses connected to the same network 9. The term "connection" or "existence" in this context indicates that, as described above, the information processing apparatus is not only physically connected to the network 9 but is electrically and functionally connected to the network 9.

In addition, the information processing apparatus in which the MS manager operates is referred to as the "MS manager apparatus", and other information processing apparatuses are referred to as "other apparatuses". The apparatuses represent the information processing apparatuses.

A method in which the MS manager confirms the existence of another information processing apparatus connected to the same network 9 is described below.

Regarding the MS manager, a DMA command is a status request command, and a transmitter ID and a response receiver ID represent the information processing apparatuses. The MS manager generates a software cell in which a receiver ID is not specified, transmits the software cell to the network 9, to which the information processing apparatuses are connected, and sets a timer for confirming network connection. Time-out of the timer is, for example, ten minutes.

When a different information processing apparatus is connected to the network system, the different apparatus receives a software cell of the above status request command, and transmits, to one information processing apparatus, which issues a status request command specified by the response receiver ID, a software cell in which the DMA command is a status request command and which includes, as data, its apparatus information. The software cell of the status request command includes at least information (such as an information processing apparatus ID, main processor information, and sub-processor information) specifying the different apparatus, and an MS status of the different apparatus.

Until time-out of the time for confirming network connection occurs, the MS manager in the information processing apparatus, which issues the status request command, monitors reception of a software cell of a status request command transmitted from a different apparatus on the network 9. When the result of monitoring indicates that a status request command in which an MS status=0 (master) is received, an MS status in the apparatus-information table of the MS manger apparatus is set to one. This causes the above apparatus to serve as a slave.

In addition, when the status request command is not received at all until the time-out of the time for confirming network connection occurs, or a status request command in which the MS status=0 (master) is not received, the MS status in the apparatus-information table of the MS manager apparatus is set to zero. This causes the apparatus to serve as a master.

In other words, when, in a state in which any information processing apparatus is not connected to the network 9, or no master exists on the network 9, a new information processing apparatus is connected to the network 9, the new information processing apparatus is set to serve a master. Conversely, when, in a state in which a master already exists on the network 9, a new information processing apparatus is connected to the network 9, the new information processing apparatus is set to serve as a slave.

In either as a master or as a slave, the MS manager monitors the state of a different information processing apparatus by referring to status information by periodically transmitting a status request command to a different information processing apparatus on the network 9. Accordingly, when the connection state of the network 9 changes, such as a case in which a status request command is not sent back from a particular different information processing apparatus in a predetermined period set for determination beforehand such that the main power to the information processing apparatus connected to the network 9 is cut off or the information processing apparatus is separated from the network 9, and a case in which a new information processing apparatus is connected to the network 9, information of the change is reported to a capability exchange program (described later).

A-8. Acquisition of Apparatus Information by Master and Slave

When being notified of reference check of a different information processing apparatus connected to the network 9, and completion of MS status setting, the main processor 21 executes the capability exchange program.

When one information processing apparatus, in which the MS manager operates, servers a master, the capability exchange program acquires apparatus information, concerning all different information processing apparatuses connected to the network 9, that is, apparatus information of each slave, is acquired.

Acquisition of apparatus information of a different information processing apparatus can be performed, as described above, such that the DMA command generates and transmits, to the different information processing apparatus, a software cell of a status request command, and subsequently receives, from the different information processing apparatus, a software cell in which the DMA command is a status request command and which includes, as data, apparatus information of the different information processing apparatus.

Similarly to the apparatus-information table of the MS manager apparatus as a master, the capability exchange program reserves, in the main memory 26 of the MS manager apparatus, an area for storing apparatus information concerning all the different information processing apparatuses connected to the network 9, and records the information as an apparatus-information table of different apparatuses (slaves). In other words, the main memory 26 in the master, the apparatus information of all the information processing apparatuses connected to the network 9, including the MS manager apparatus, is recorded.

In addition, when the MS manager apparatus serves as a slave, the capability exchange program acquires apparatus information concerning all the different information processing apparatuses connected to the network 9, that is, apparatus information of slaves other than the master and the MS manager apparatus, and records, in the main memory 26 of the MS manager apparatus, information processing apparatus IDs and MS statuses included in the apparatus information. In other words, in the main memory 26 in the slave, the apparatus information of the MS manager apparatus is recorded in the form of an apparatus-information table, and information processing apparatus IDs and MS statuses of the master and slaves connected to the network 9 are recorded in the form of another apparatus-information table.

When being notified as described above by the MS manager that a new information processing apparatus is connected to the network 9, either for the master or for the slave, the capability exchange program acquires apparatus information of the new information processing apparatus and records the acquired information in the main memory 26, as described above.

The execution of the MS manager and the capability exchange program is not limited to execution by the main processor 21, but both may be executed by one sub-processor 23. In addition, it is preferable that the MS manager and the capability exchange program be resident programs that constantly operate while information-processing-apparatus main power is on.

A-9. When Information Processing Apparatus is Disconnected from Network

When being notified as described above by the MS manager that the main power for an information processing apparatus connected to the network 9 is turned off, or an information processing apparatus is disconnected from the network 9, either in the master or in the slave, the capability exchange program deletes the apparatus-information table of the information processing apparatus from the main memory 26 of one information processing apparatus, in which the capability exchange program operates.

Furthermore, when the information processing apparatus disconnected from the network 9, as described above, serves as a master, a new master is determined by the following method.

For example, each of information processing apparatuses, which are not disconnected from the network 9, replaces its and other information processing apparatus IDs by numerical values, and compares its ID value with the other ID values. When its ID value is the least among the ID values of the information processing apparatuses, which are not disconnected from the network 9, the apparatus, which serves as a slave, changes to serve as a master, and sets the MS status to zero. The apparatus, which serves a master, acquires apparatus information of all the other information processing apparatuses (slaves) connected to the network 9, records the apparatus information in the main memory 26.

A-10. Distributed Processing Based on Apparatus Information

In order that, as shown in the lower part of FIG. 5, the information processing apparatuses 1 to 4 connected to the network 9 may operate as the virtual information processing apparatus 7, the master needs to grasp a user's operation and the operating state of the slaves.

FIG. 7 shows a state in which four information processing apparatuses 11, 12, 13, and 14 operate as one virtual information processing apparatus 7. In the example shown in FIG. 7, the information processing apparatus 1 operates as a master, and the information processing apparatuses 2, 3, and 4 operate as slaves A, B, and C, respectively.

When the user operates one information processing apparatus connected to the network 9, if the operated apparatus is the master 1, information of the operation is directly grasped by the master 1. If the operated apparatus is one of the slaves, information of the operation is transmitted from the operated slave to the master 1. In other words, regardless of whether the apparatus operated by the user is either of the master 1 and the slave, the operation information is constantly grasped by the master 1. Transmission of the operation information is performed by a software cell whose DMA command is, for example, an operation-information transmitting command.

The main processor 21-1 included in the information processing controller 11 in the master 1 selects a functional program, which is to be executed, in accordance with the operation information. In this case, the main processor 21-1 in the information processing controller 11 in the master 1 uses the above method to load the functional program from the external recording units 28-1 and 28-2 in the master 1 to the main memory 26-1, if necessary. However, one of the other information processing apparatuses (slaves) may transmit the functional program to the master 1.

In the functional program, apparatus-requirements specifications (see FIG. 4), such as an information-processing-apparatus-type ID, processing capability of a main processor or a sub-processor program, a memory utilization size, and external-recording-unit conditions, which are necessary in each executable unit of the functional program, are defined.

The main processor 21-1 in the information processing controller 11 in the master 1 reads the requirements specifications, which are necessary for each functional program. In addition, by referring to the apparatus-information table recorded in the main memory 26-1 beforehand by the capability exchange program, the main processor 21-1 reads apparatus information of each information processing apparatus. The information read represents the information, shown in FIG. 4, such as the information-processing-apparatus ID, and is information of the main processor 21, the sub-processor 23, the main memory 26, and the external recording unit 28.

The main processor 21-1 in the information processing controller 11 in the master 1 sequentially compares the apparatus information of each information processing apparatus connected to the network 9 with the above requirements specifications necessary for executing the functional program.

For example, when the functional program needs a video recording function, only an information processing apparatus having a video recording function is specified and extracted based on the information-processing-apparatus-type ID. Furthermore, a slave in which conditions, concerning main-processor or sub-processor processing capability, main memory utilization size, and external recording units, necessary for executing the functional program, can be ensured is specified as an execution-request candidate apparatus. If a plurality of execution-request candidate apparatuses are specified, one is selectively specified from among them.

After the slave, in which execution is requested, is specified, the main processor 21-1 in the information processing controller 11 in the master 1 updates, for the specified slave, the apparatus-information table of the slave, which is recorded in the main memory 26-1 in the information processing controller 11 in the master 1.

The main processor 21-1 in the information processing controller 11 in the master 1 generates a software cell whose DMA command is a functional program execution command, sets, in the cell interface of the software cell, information of necessary sub-processors and sandbox size (see FIG. 3) concerning the functional program, and transmits the software cell to the slave.

The slave, in which the execution of the functional program is requested, executes the functional program and updates the apparatus-information table of the slave. On this occasion, the main processor 21 in the information processing controller in the slave uses the above method to load, from the external recording unit 28, into the main memory 26, a functional program and a sub-processor program which operates in a form linked thereto.

When, in the external recording unit 28 in the slave, in which the execution of the functional program is requested, the functional program and the sub-processor program which operates in a form linked thereto are not recorded, the network system may be formed so that a different information processing apparatus can transmit the functional program or the sub-processor program to the slave, in which the execution of the functional program is requested.

The sub-processor program may also be executed by the different information processing apparatus by using the above-described load command and kick command.

After finishing the execution of the functional program, the main processor 21 in the information processing controller in the slave, which executes the functional program, transmits a termination report to the main processor 21-1 in the information processing controller 11 in the master 1, and updates the apparatus-information table of the slave. On receiving the termination report, the main processor 21-1 in the information processing controller 11 in the master 1 updates the apparatus-information table of the slave, which executes the functional program.

Based on the result of reference to the apparatus-information tables of the master 1 and the other information processing apparatuses, the main processor 21-1 in the information processing controller 11 in the master 1 may select the master 1 itself as an information processing apparatus capable of executing the functional program. In this case, the master 1 executes the functional program.

Distributed processing in which, in the example shown in FIG. 7, the user operates slave A (information processing apparatus 2) and a functional program corresponding to the operation is executed by different slave B (information processing apparatus 3) is described below with reference to FIG. 8.

Figure 8:
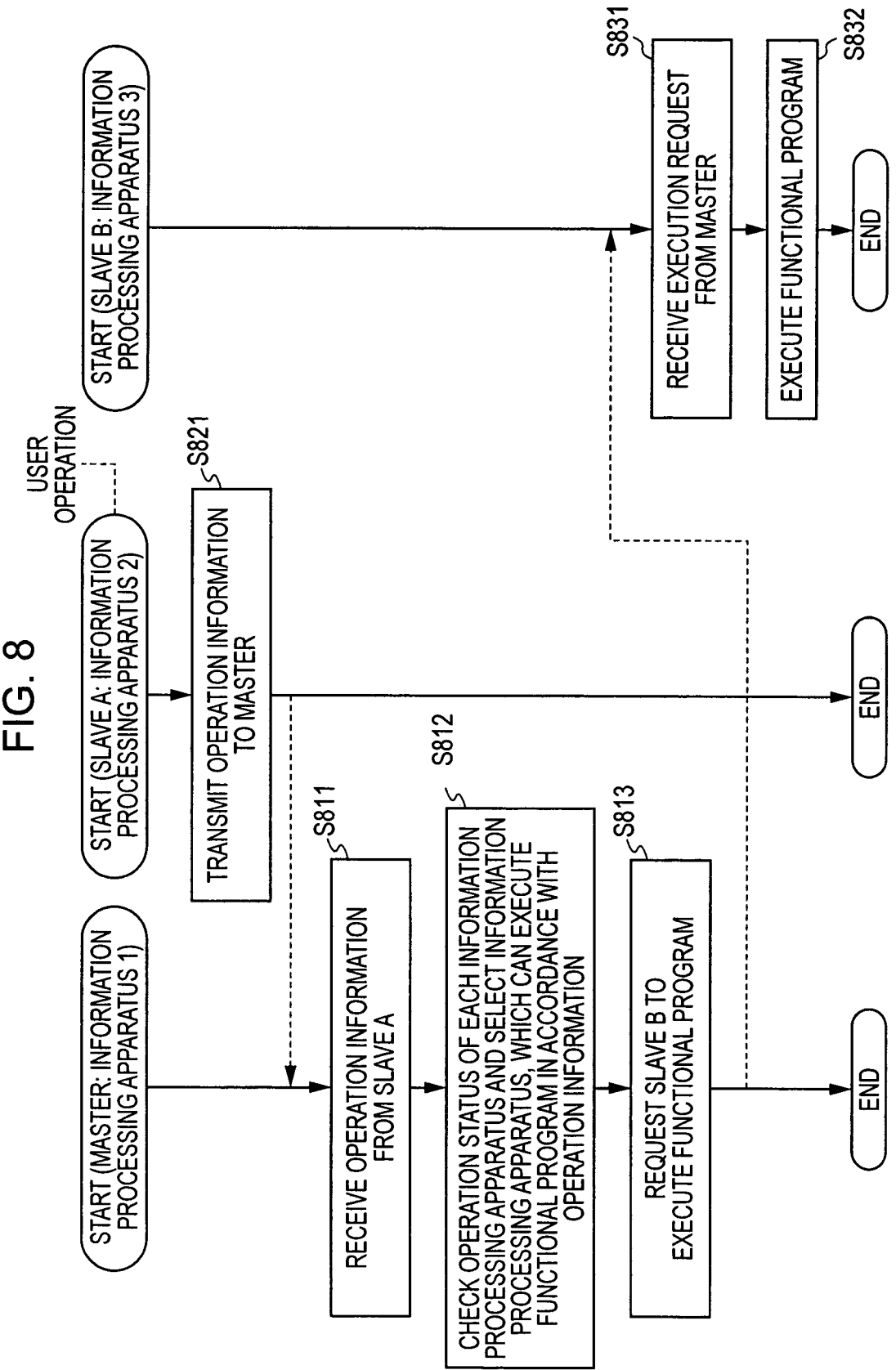
FIG. 8 is a flowchart showing distributed processing in the system shown in FIG. 7.

In the example shown in FIG. 8, distributed processing in the entire network system including slave A is initiated such that the user operates slave A. At first, in step S821, slave A transmits the operation information to the master 1.

In step S811, the master 1 receives the operation information. In step S812, the master 1 checks the operation status of each information processing apparatus from the apparatus-information tables of the master 1 and the other information processing apparatuses which are recorded in the main memory 26-1 in the master 1, and selects one information processing apparatus, which can execute a functional program corresponding to the received operation information. In the example shown in FIG. 8, slave B is selected.

Next, in step S813, the master 1 requests the selected slave B to execute the functional program.

In step S831, slave B receives the execution request. In step S832, slave B executes the functional program whose execution is requested.

As described above, by operating only one information processing apparatus without operating the other information processing apparatuses, the user can allow information the processing apparatuses 1, 2, 3, and 4 to operate as the virtual information processing apparatus 7.

A-11. Specific Example of Each Information Processing Apparatus and System

Figure 9:
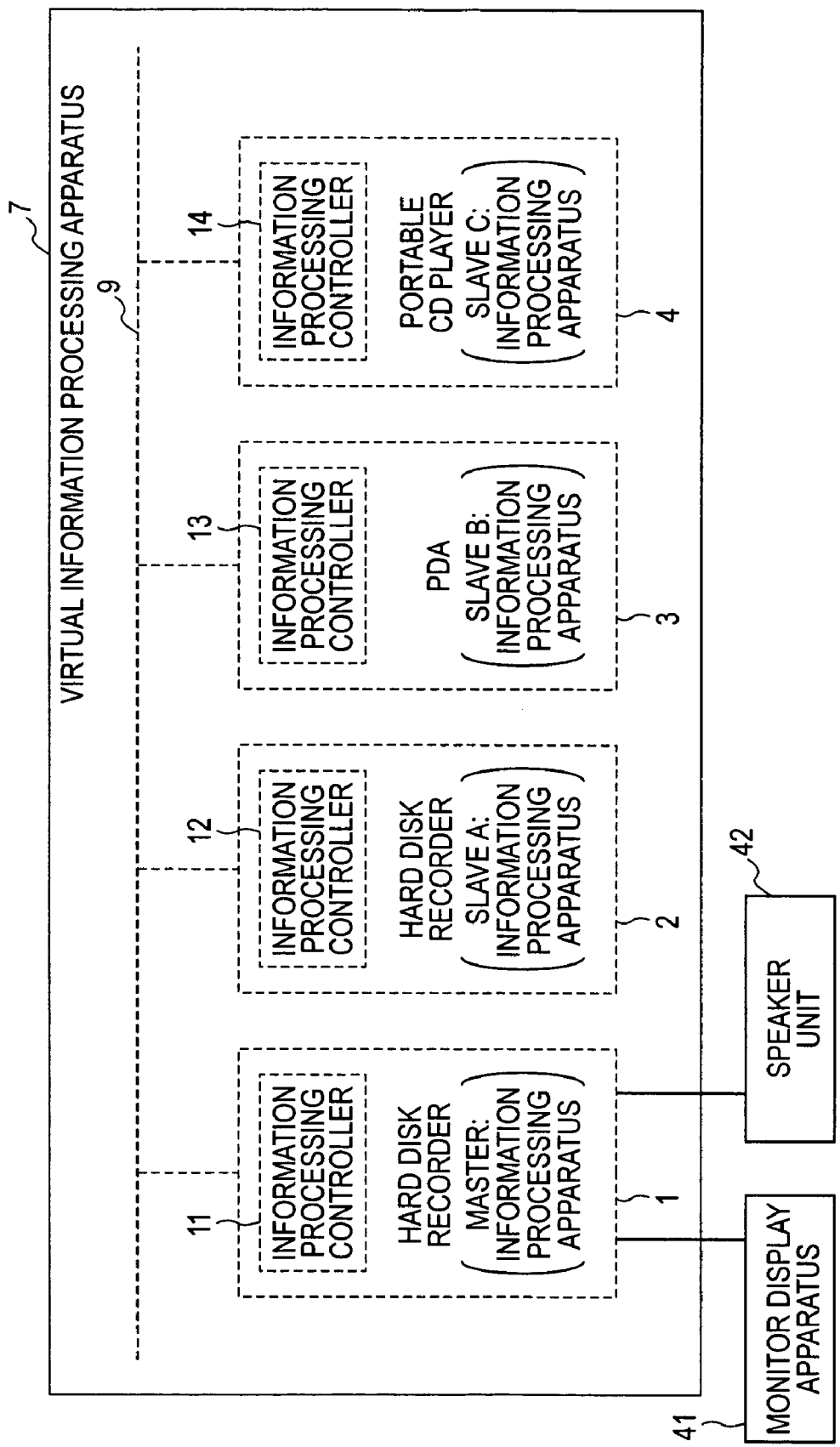
FIG. 9 is a block diagram showing specific examples of information processing apparatuses and a system.

The information processing apparatuses 1, 2, 3, and 4, connected to one another by the network 9, may have any configurations if, in the configurations, information processing is performed by the above-described information processing controllers 11, 12, 13, and 14. FIG. 9 shows an example of the configuration of the virtual information processing apparatus 7.

An example of the information processing apparatus 1 including the information processing controller 11 is a hard disk recorder. FIGS. 10 and 11 show the hardware configuration and software configuration of the hard disk recorder in FIG. 9, respectively. Regarding the hardware configuration of the hard disk recorder, the hard disk recorder has a built-in hard disk as the external recording unit 28-1 shown in FIG. 1, and is designed so that an optical disc, such as DVD±R/RW, CD±R/RW, or Bluray Disc, can be loaded. A bus 31-1 connected to a bus 29-1 in the information processing controller 11 connects to a broadcast receiving unit 32-1, a video input unit 33-1, an audio input unit 34-1, a video output unit 35-1, an audio output unit 36-1, an operation panel unit 37-1, a remote-control photo-receiving unit 38-1, and a network connecting unit 39-1.

The broadcast receiving unit 32-1 receives a broadcast signal, or the video input unit 33-1 and the audio input unit 34-1 respectively receive video audio signals input from the exterior. Each unit converts the received signal into digital data and sends the data to the bus 31-1 for processing in the information processing controller 11. The video output unit 35-1 and the audio output unit 36-1 respectively process video data and audio data sent from the information processing controller 11 to the bus 31-1, and send the processed data to the exterior of the information processing apparatus 1 in unchanged digital data form or in analog signal form. The remote-control photo-receiving unit 38-1 receives a remote control infrared signal from the remote-control transmitting/receiving unit 43-1.

As shown in FIGS. 9 and 10, the video output unit 35-1 and audio output unit 36-1 in the information processing apparatus 1 (hard disk recorder) connect to a monitor display apparatus 41 and a speaker unit 42, respectively.

Also the information processing apparatus 2 (shown in FIG. 2) including the information processing controller 12 is identical in configuration to the information processing apparatus 1, as denoted by the bracketed reference numerals shown in FIG. 10. However, as shown in FIG. 9, no monitor display apparatus and speaker unit are connected to the information processing apparatus 2 (hard disk recorder).

Figure 11A:
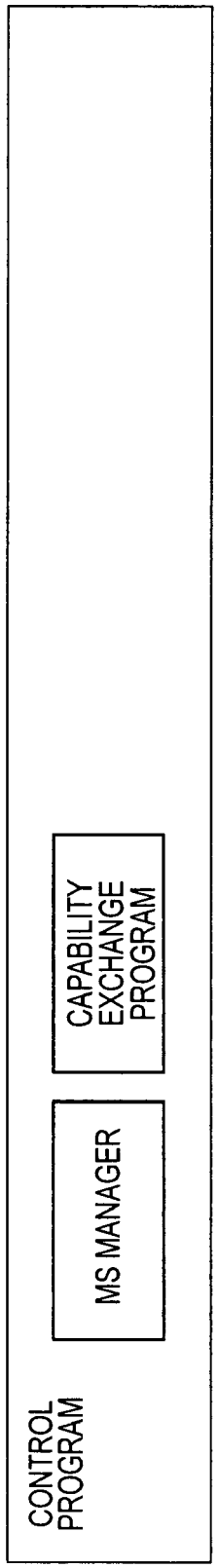
FIGS. 11A, 11B, and 11C are illustrations of the software configuration of the hard disk recorder shown in FIG. 9.
Figure 11B:
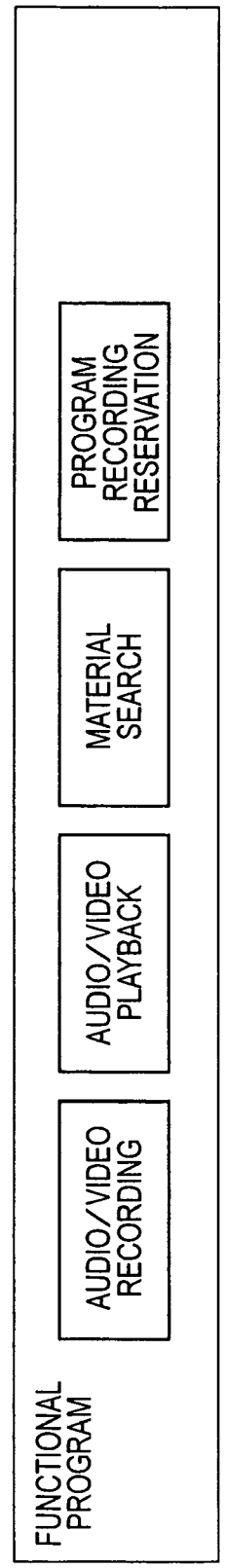
Figure 11C:
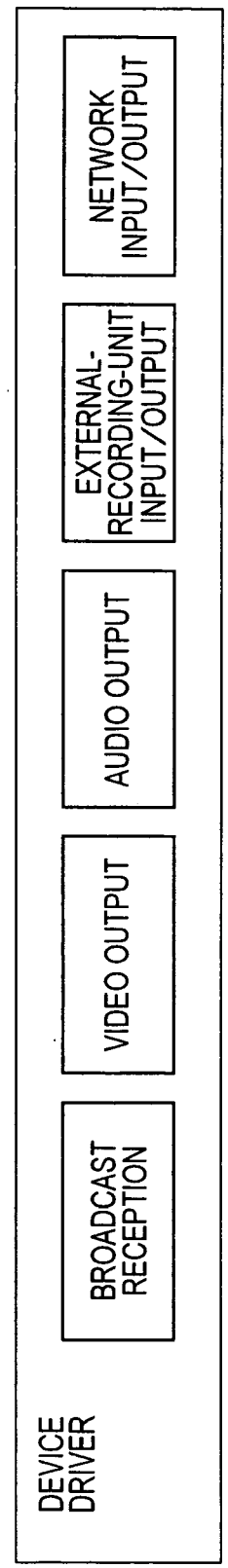

Regarding the software configuration of the information processing apparatuses 1 and 2 (hard disk recorders), that is, the information processing controllers 11 and 12, as shown in FIGS. 11A, 11B, and 11C, they have an MS manager and a capability exchange program as control programs, and, as functional programs, programs for audio/video recording, audio/video playback, material search, and program recording reservation. In addition, they have, as device drivers, programs for broadcast reception, video output, audio output, external-recording-unit input/output, and network input/output.

Figure 12:
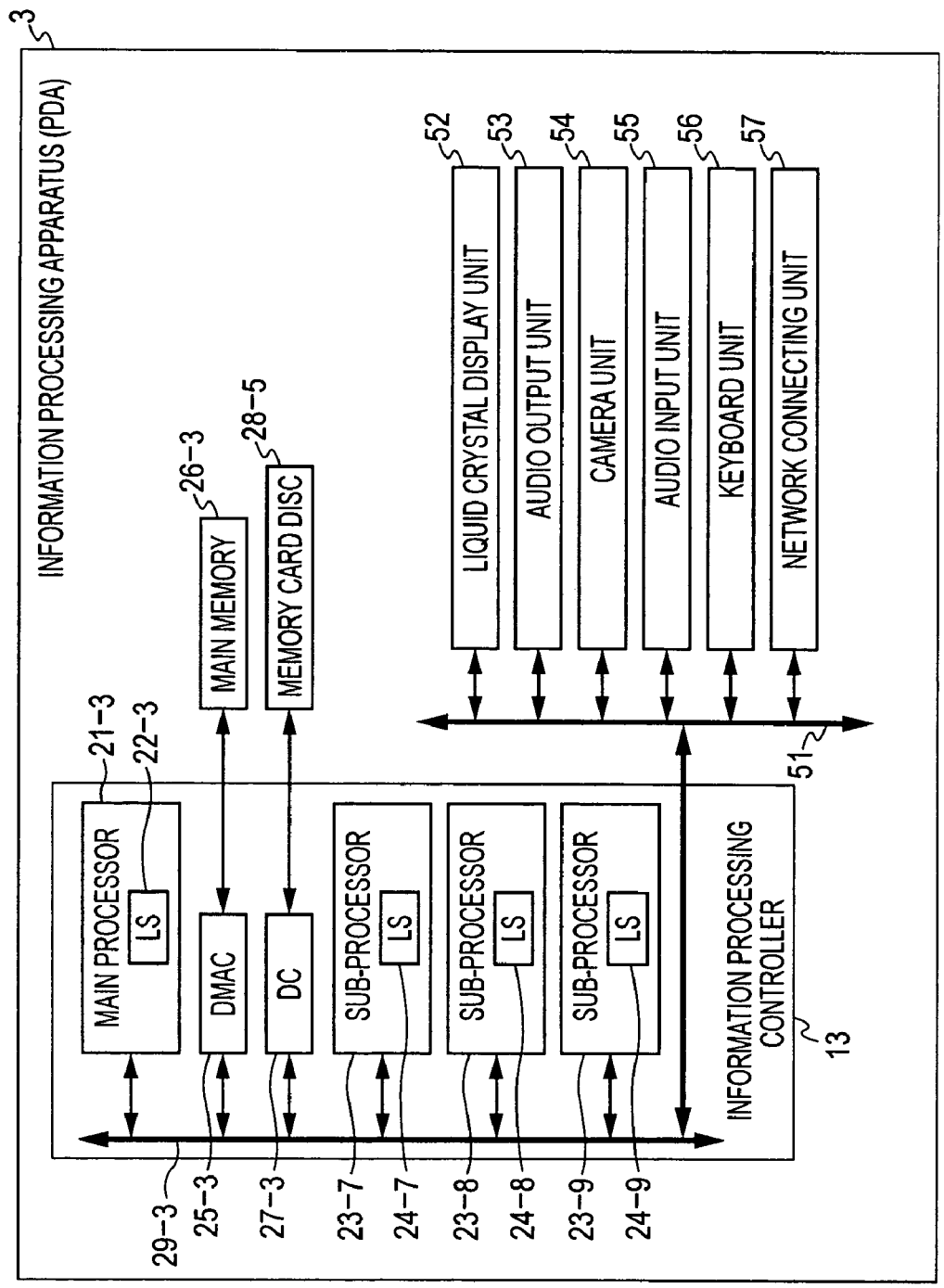
FIG. 12 is a block diagram showing the hardware configuration of the PDA shown in FIG. 9.

Another example of the information processing apparatus including the disc control unit 13 is a PDA (personal digital assistant). FIG. 12 shows the hardware configuration of the information processing apparatus 3, which is formed as a PDA. In the example shown in FIG. 12, the information processing apparatus 3 is designed so that a memory disc can be loaded as an external recording unit in the information processing apparatus 3 shown in FIG. 1. A bus 51, connected to a bus 29-3 in an information processing controller in the information processing apparatus 3, connects to a liquid crystal display unit 52, an audio output unit 53, a camera unit 54, an audio input unit 55, a keyboard unit 56, and a network connecting unit 57.

The information processing controller in the information processing apparatus 3, whose inside is not shown in FIG. 1, includes a main processor 21-3, sub-processors 23-7, 23-8, and 23-9, a DMAC 25-3, a DC 27-3, and a bus 29-3. The processor 21-3 includes an LS 22-3. The sub-processors 23-7, 23-8, and 23-9 include LSs 24-4, 24-8, and 24-9, respectively.

Figure 13A:
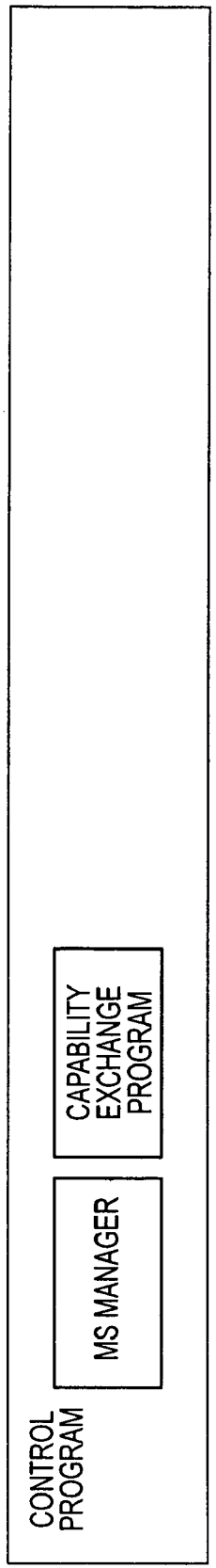
FIGS. 13A, 13B, and 13C are illustrations of the software configuration of the PDA shown in FIG. 9.
Figure 13B:
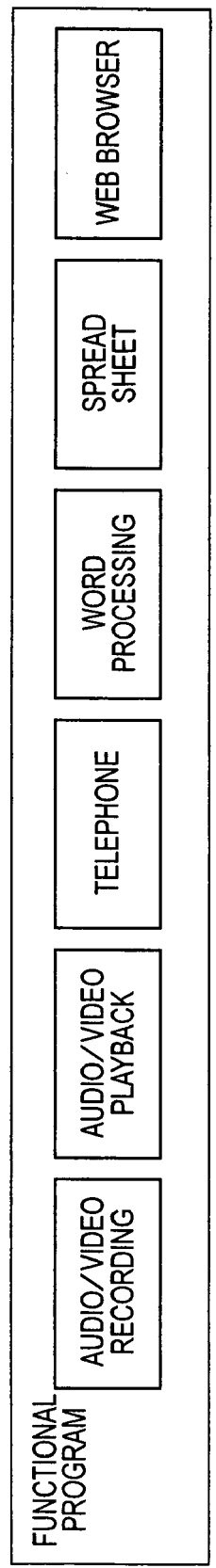
Figure 13C:
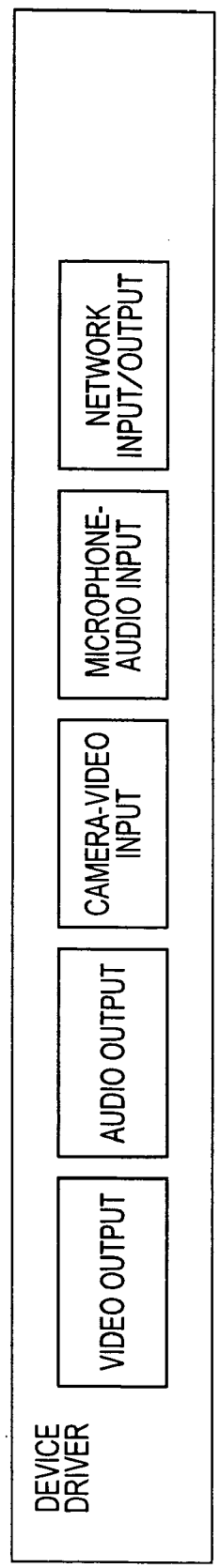

In addition, FIGS. 13A, 13B, and 13C show the software configuration of the information processing apparatus 3 (PDA), that is, the information processing controller 13. As shown in FIGS. 13A, 13B, and 13C, the information processing apparatus 3 has an MS manager and a capability exchange program as control programs, and, as functional programs, programs for audio/video recording, audio/video playback, telephone, word processing, spread sheet, and web browser. The information processing apparatus 3 has, as device drivers, programs for video output, audio output, camera-video input, microphone-audio input, and network input/output.

Figure 14:
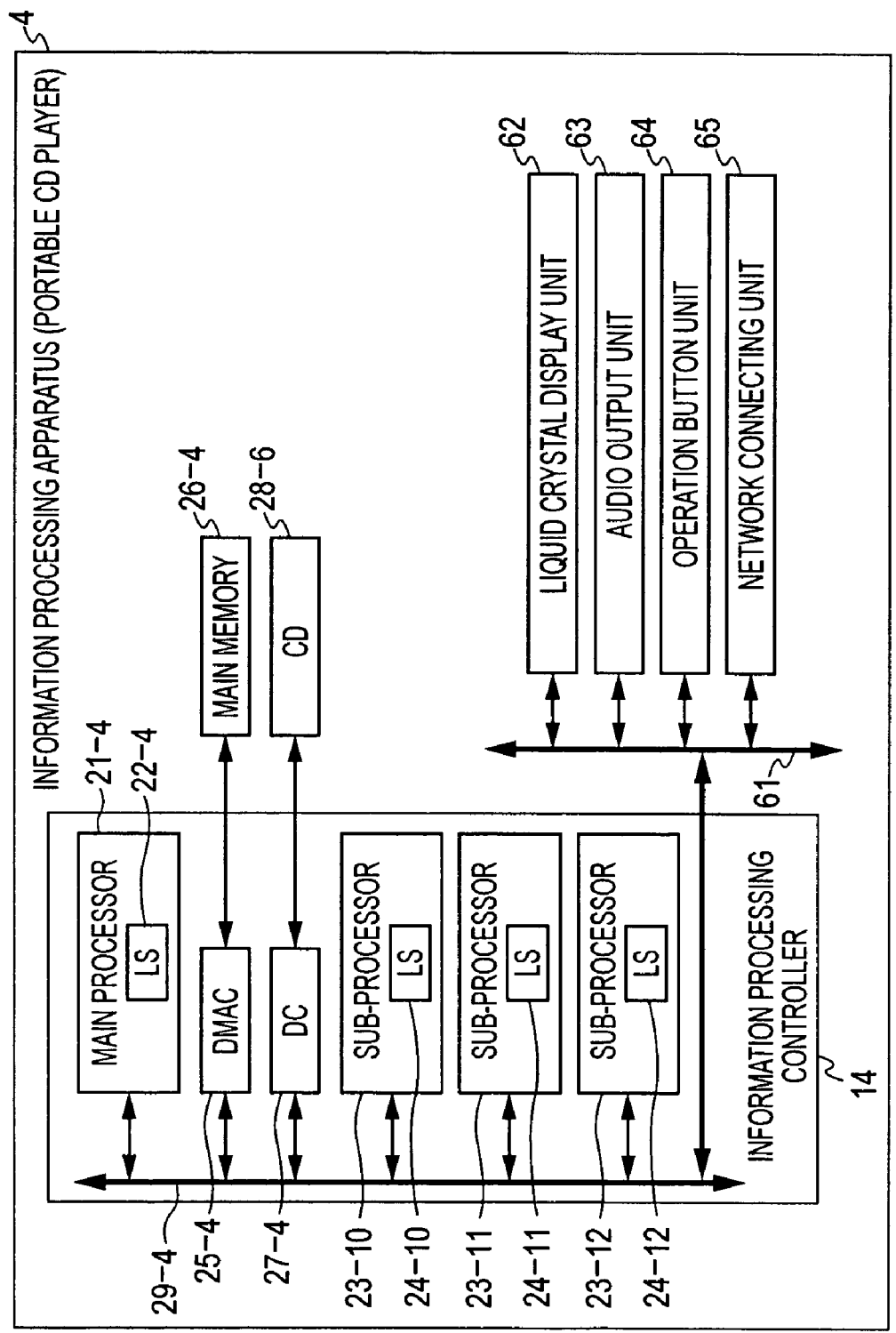
FIG. 14 is a block diagram showing the hardware configuration of the portable CD player shown in FIG. 9.

In addition, the information processing apparatus 4 including the user-operation input unit 14 is a portable CD player. FIG. 14 shows the configuration of the portable CD player. In the example shown in FIG. 14, the portable CD player is designed so that a CD (compact disc) can be loaded as the external recording unit 28-6 shown in FIG. 1. A bus 61 connected to a bus 29-4 in the user-operation input unit 14 connects to a liquid crystal display unit 62, an audio output unit 63, an operation button unit 64, and a network connecting unit 65.

The information processing controller 14, whose inside is not shown in FIG. 1, includes a main processor 21-4, sub-processors 23-10, 23-11, and 23-12, a DMAC 25-4, a DC 27-4, and a bus 29-4. The main processor 21-4 includes an LS 22-4. The sub-processors 23-10, 23-11, and 23-12 include LSs 24-10, 24-11, and 24-12, respectively.

Figure 15A:
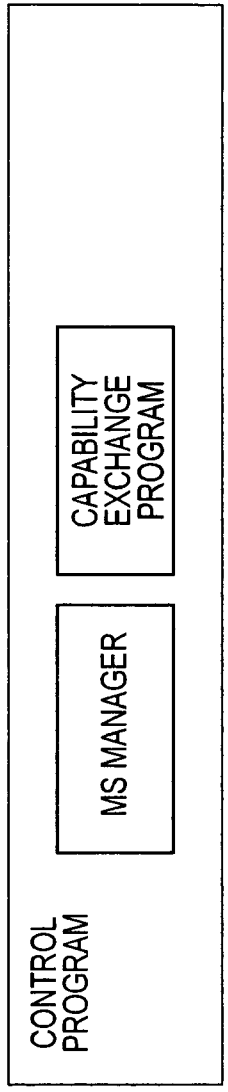
FIGS. 15A, 15B, and 15C are illustrations of the software configuration of the portable CD player shown in FIG. 9.
Figure 15B:
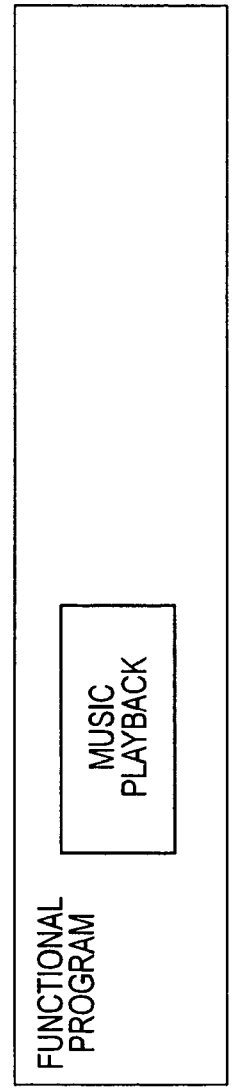
Figure 15C:
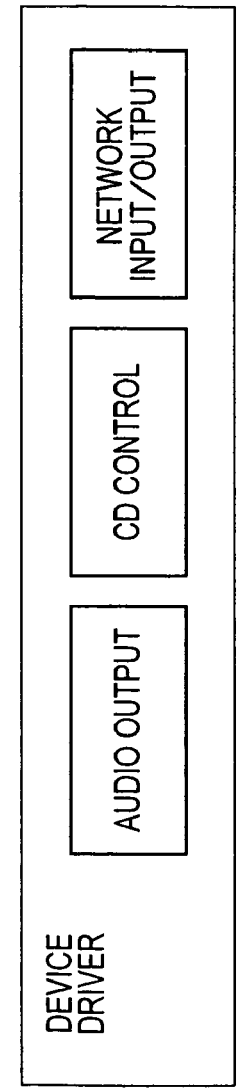

FIGS. 15A, 15B, and 15C show the software configuration of the information processing apparatus 4 (portable CD player), that is, the information processing controller 14. As shown in FIGS. 15A, 15B, and 15C, the information processing apparatus 4 has an MS manager and capability exchange program as control programs, a music playback program as a functional program, and, as device drivers, audio output, CD control, and network input/output.

In the network system shown in FIG. 9, the information processing apparatuses 1, 3, and 4 are connected to the network 9, and the information processing apparatus 1 is set to serve as a master (MS status=0), and the information processing apparatuses 3 and 4 are set to serve as slaves (MS status=1).

When, in this state, the information processing apparatus 2 is newly connected to the network 9, the MS manager, which is executed in the main processor 21-2 in the information processing controller 12 in the information processing apparatus 2, uses the above-described method to recognize that the information processing apparatus 1 already exists as a master by referring to the MS statuses in the other information processing apparatuses 1, 3, and 4, and sets the information processing apparatus 2 to serve as a slave (MS status=1). In addition, the master 1, which is set to serve as a master, collect apparatus information of the other information processing apparatuses including the newly added information processing apparatus 2, and updates the apparatus-information table in the main memory 26-1.

A case in which, in this state, the information processing apparatus 3 (PDA) as the slave is operated by the user in order to reserve recording of a two-hour broadcast program is described below.

In this case, the information processing apparatus 3 (PDA) as the slave receives, from the user, input recording reservation information including information such as a recording-start time, a recording-end time, a broadcast channel to be recorded, and recording quality, and generates and transmits, to the information processing apparatus 1 as the master, a software cell including the recording reservation information and a recording reservation command as a DMA command.

The main processor 21-1 in the information processing controller 11 in the information processing apparatus 1, which receives the software cell whose DMA command is a recording reservation command, reads the recording reservation command, and specifies one information processing apparatus, which can execute the recording reservation command, by referring to the apparatus-information table in the main memory 26-1.

At first, the main processor 21-1 reads the information-processing-apparatus-type ID, included in the apparatus-information table, of each of the information processing apparatuses 1, 2, 3, and 4, extracts one information processing apparatus, which can execute a functional program corresponding to the recording reservation command. Here, the information processing apparatuses 1 and 2, which have information-processing-apparatus-type IDs each representing the recording function, are specified and the information processing apparatuses 3 and 4 are excluded from candidate apparatuses.

Next, by referring to the apparatus-information table, the main processor 21-1 in the information processing controller 11 in the information processing apparatus 1 as the master reads apparatus information such as main-processor or sub-processor processing capability of the information processing apparatuses 1 and 2, and main memory information, and determines whether the information processing apparatuses 1 and 2 satisfy requirements specifications necessary for executing the functional program corresponding to the recording reservation command. Here, both the information processing apparatuses 1 and 2 satisfy the requirements specifications necessary for executing the functional program corresponding to the recording reservation command.

Furthermore, by referring to the apparatus-information table, the main processor 21-1 reads external-recording-unit information of the information processing apparatuses 1 and 2, and determines whether a free area size of the external recording unit satisfies an area size necessary for executing the execution of the recording reservation command. Since the information processing apparatuses 1 and 2 are hard disk recorders, a difference between the total size and utilization size of each of the hard disks 28-1 and 28-3 corresponds to the free area size of each apparatus.

It is assumed that, in this case, the free area size of the hard disk 28-1 in the information processing apparatus 1 is ten minutes in terms of a recording time and the free area size of the hard disk size 28-3 in the information processing apparatus 2 is twenty hours in terms of a recording time.

At this time, the main processor 21-1 in the information processing controller 11 in the information processing apparatus 1 as the master specifies, as a slave in which the execution of the command is requested, one information processing apparatus, which can reserve a free area size for two hours which is necessary for executing the recording reservation command.

As a result, only the information processing apparatus 2 is selected as a slave in which the execution of the command is requested, and, by transmitting the recording reservation command (including the recording reservation information) transmitted from the information processing apparatus 3, which is operated by the user, the main processor 21-1 in the information processing controller 11 in the information processing apparatus 1 as the master requests the execution of reservation of recording of the two-hour broadcast program.

The main processor 21-2 in the information processing controller 12 in the information processing apparatus 2 analyzes the recording reservation command, loads a functional program necessary for recording from the hard disk 28-3 into the main memory 26-2, and executes recording in accordance with the recording reservation information. As a result, audio/video data of the two-hour broadcast program whose recording is reserve red is recorded on the hard disk 28-3.

As described above, also in the network system shown in FIG. 9, by operating only one information processing apparatus without operating the other information processing apparatuses, the user can allow the information processing apparatuses 1, 2, 3, and 4 to operate as the virtual information processing apparatus 7.

B. Execution of Functional Program in Accordance with Start Conditions

As described above, according to an embodiment of the present invention, by mutually linking a plurality of network-connected information processing apparatuses, a virtual apparatus can be realized. In a further embodiment of the present invention, a system state that includes surplus processing capability of a virtual apparatus including a plurality of network-connected apparatuses and a connecting state of the apparatuses is monitored, and a function in accordance with the system state, which varies with time can be realized. In other words, the system state, such as the surplus processing capability of the virtual apparatus and the connecting state of the apparatuses meet predetermined start conditions, a functional program set beforehand can be activated. In addition, by providing means for freely and easily changing the start conditions, user's convenience can be enhanced.

B-1. System Configuration

Figure 16:
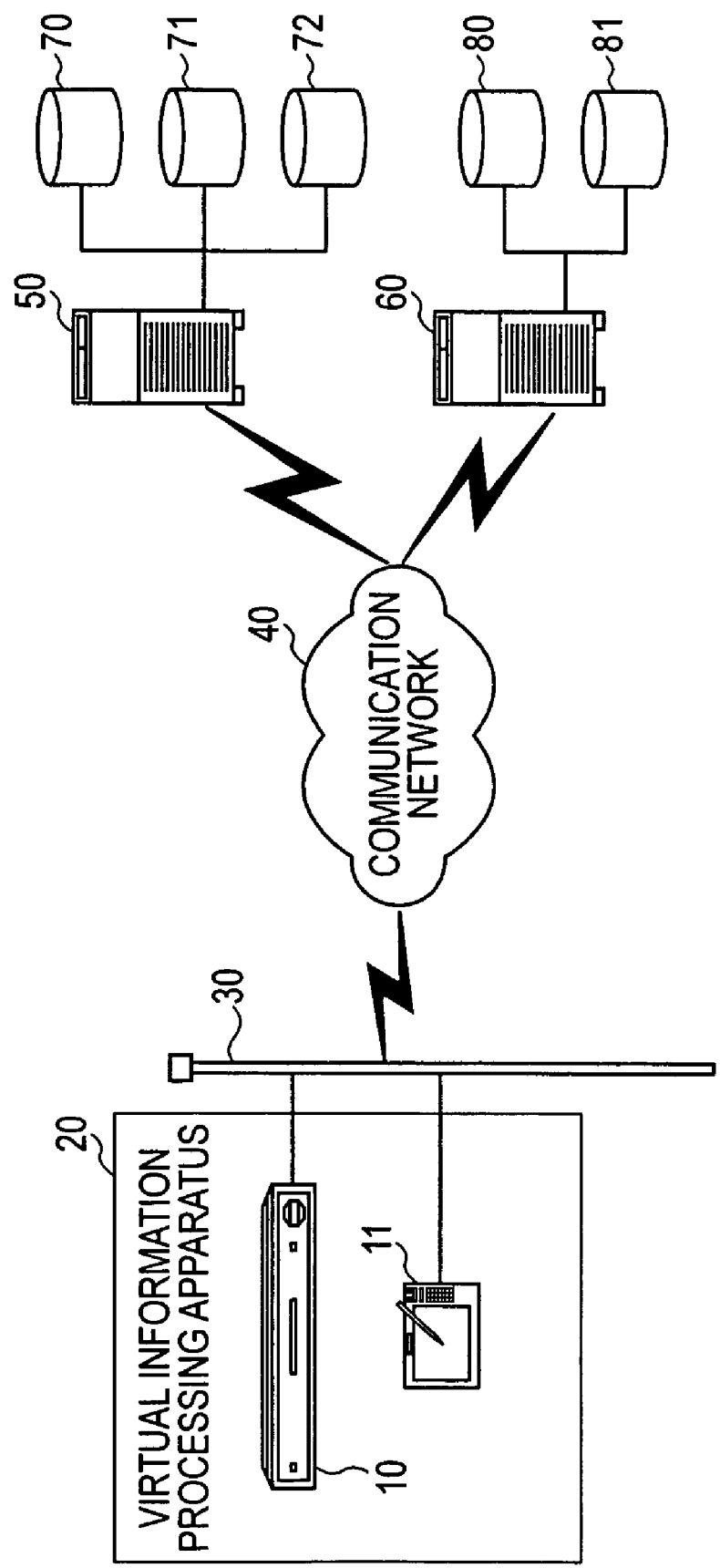
FIG. 16 is a schematic block diagram showing the configuration of a network system according to an embodiment of the present invention.

FIG. 16 is a schematic illustration of a network system according to an embodiment of the present invention. In the shown network system, a virtual information processing apparatus 20 is formed by linking a plurality of information processing apparatuses 10, 11, etc., which are connected to one another by a local network 30.

One of the information processing apparatuses 10, 11, etc., operates as a master, and the other apparatuses operate as slaves, as described above.

The virtual information processing apparatus 20 includes, in a system formed as a set of the information processing apparatuses 10, 11, etc., an acquiring unit for acquiring performance information which is necessary for executing functions. Specifically, the information processing apparatus, which operates as the master, mainly realizes the acquiring unit.

The virtual information processing apparatus 20 can connect to servers via a communication network 40 such as the Internet. The server can open various types of information. In this embodiment, the servers include an information providing server 50 and an information collecting server 60.

The information providing server 50 includes a start-condition setting database 70, an information providing database 71, and a utilization-history-storage setting database 72. The virtual information processing apparatus 20 uses the information providing server 50 to acquire targeted data and software from the databases 71 to 72.

The information collecting server 60 stores, in a utilization-history database 80, a utilization history sent from the virtual information processing apparatus 20. Statistical information generated from the utilization-history database 80 is managed in a statistical information database 81. In the obtained information, a piece of information which seems useful, is reflected in the start-condition setting database 70 and information providing database 71 in the information providing server 50.

B-2. Configuration of Information Processing Apparatus

Figure 17:
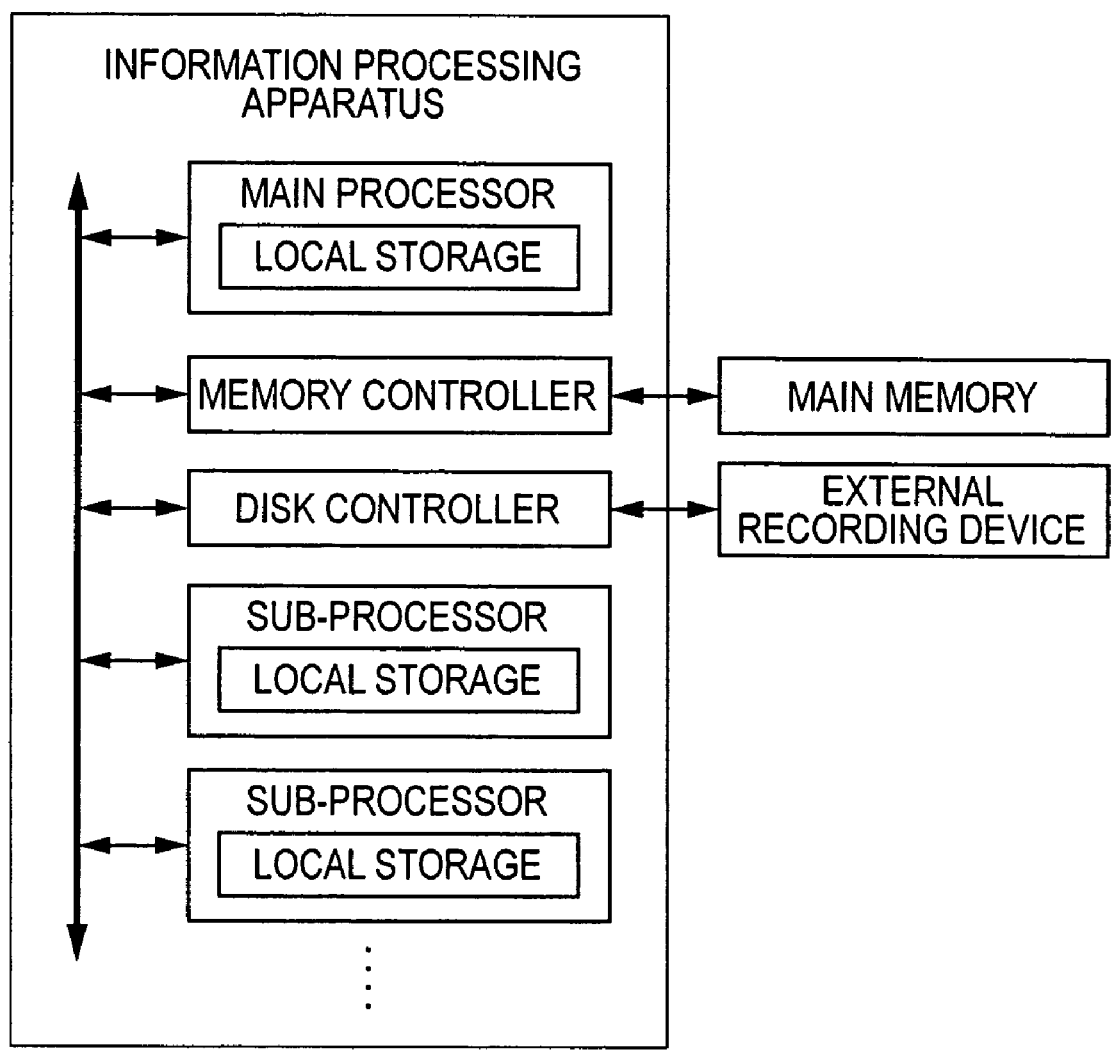
FIG. 17 is a schematic block diagram showing the configuration of an information processing apparatus included in a virtual information processing apparatus.

FIG. 17 is a schematic block diagram of the configuration of the information processing apparatus 10 included in the virtual information processing apparatus 20. The information processing controller 11 also has a basically identical configuration, which is not shown.

The information processing apparatus 10 has a multiprocessor configuration including at least one sub-processor capable of executing a program loaded into its local storage, and a main processor for ordering the sub-processor to execute the program. According to this multiprocessor configuration, linkage of the sub-processors can realize processing, which is a high load on one processor, by distributing the processing, or two or more related types of data processing can be executed with synchronization and cooperation. Thus, highly-functional and high-valued added service can be provided to the user.

The processors share a main memory through a system bus, and processing data in the system is loaded into the main memory. A main processor assigns portions of the data processing in the main memory to sub-processors, and instructs them to execute the portions of the data processing. Each sub-processor executes the assigned portion of the data processing by loading a sub-processor program for executing distributed processing, and starting the program in response to an instruction from the main processor.

A dynamic RAM (DRAM), which has a relatively mass storage and a low unit price per storage unit, is used as the main memory. This causes problems of large latency between the sub-processor and the main memory, and conflict of accessing the main memory by the sub-processors. Accordingly, each of the main processor and the sub-processors includes a dedicated local storage, and uses the local storage as a so-called "cache memory" when processing data in the main memory, whereby conflict of accessing the main memory and an increase in traffic of the system bus are prevented. The shown system has the following features:

(1) Each sub-processor includes a dedicated local storage;

(2) Each sub-processor does not directly access locations other than the dedicated local storage;

(3) A relatively low speed memory element, such as a DRAM, is used as the main memory; and (4) Each sub-processor has a mechanism that caches a partial area of the main memory in the local storage, if necessary.

In addition, the processors share a mass-storage external recording device including a hard disk through the system bus. The operation of accessing the external recording device is performed through a disk controller (DC).

The information processing apparatus 10 can link to the information processing apparatus 11, which is connected to a local network 30, to form the virtual information processing apparatus 20. In the process of this linkage operation, the information processing apparatus 10 acquires apparatus of the information processing apparatus 11, as shown in FIG. 18.

Figure 18:
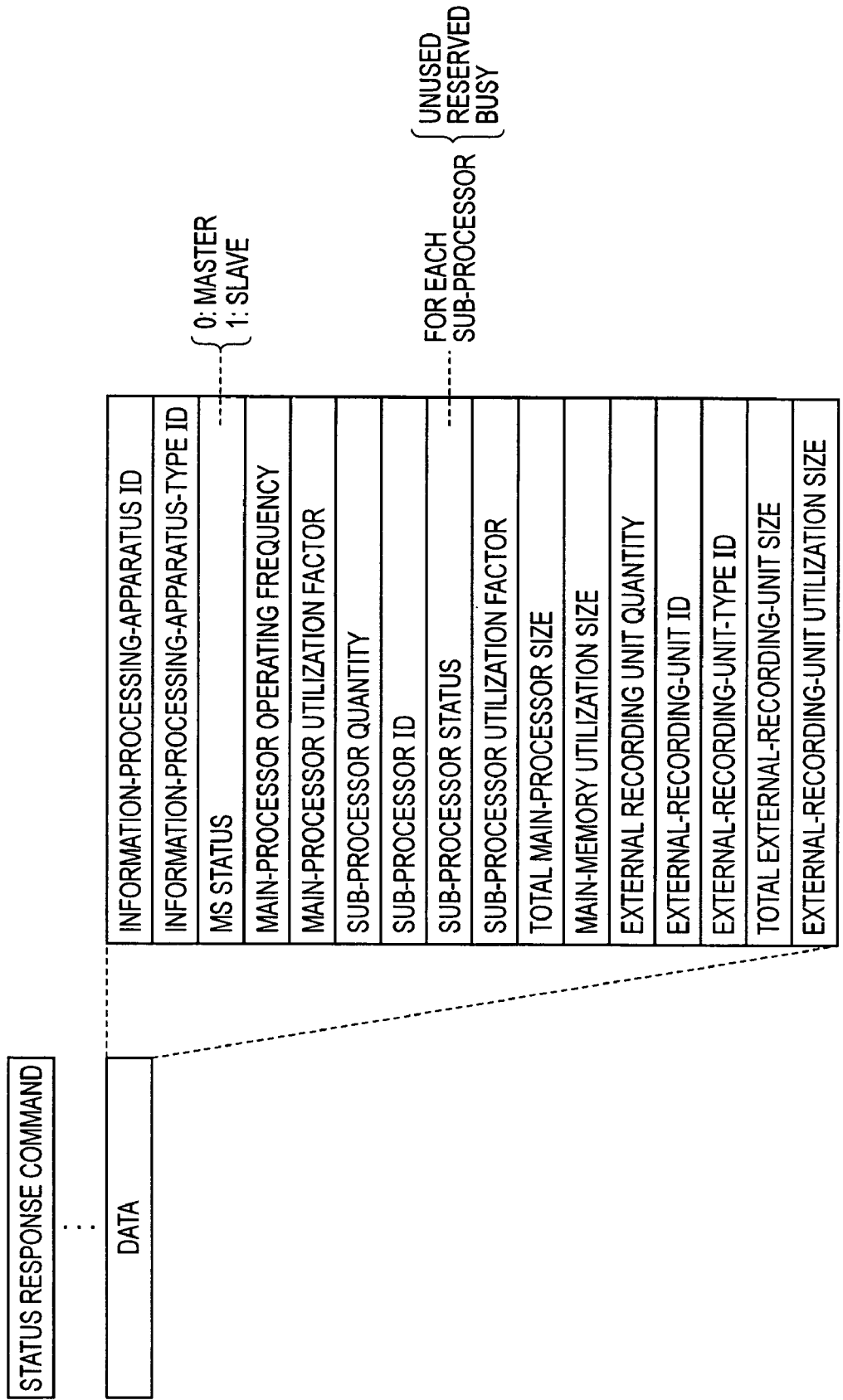
FIG. 18 is an illustration of an apparatus information list.

In FIG. 18, an information-processing-apparatus ID is an identifier for identifying an information processing apparatus that can send its apparatus information as a response. The information-processing-apparatus ID includes a value representing a feature of the information processing apparatus. The feature of the information processing apparatus may represent a type of product such as a hard disk recorder, a PDA, or a television, or may represent a function type such as image processing or video recording/playback.

An MS status indicates in which of master and slave mode the information processing apparatus operates. When the MS status is one, it indicates that the information processing apparatus operates as a master. When the MS status is one, it indicates that the information processing apparatus operates as a slave.

A main-processor operating frequency represents an operating frequency of the main processor (CPU). A main-processor utilization factor represents a rate at which all presently operating programs are used in the main processor (CPU).

A sub-processor quantity represents the number of sub-processors in the information processing apparatus. A sub-processor ID is an identifier for identifying a sub-processor in the information processing apparatus. A sub-processor utilization factor represents a rate at which a program operating in the sub-processor is used. The sub-processor ID and the sub-processor utilization factor form a set, and sets of the sub-processor ID and the sub-processor utilization factor exist for as many as the number of sub-processors.

A total main-memory size and a memory utilization size respectively represent the total size of the main memory, which is connected to the information processing apparatus, and a size of the main memory 26 which is presently used.

The information processing apparatus 10 as the master can collect apparatus information of each information processing apparatus and can calculate surplus processing capability of the virtual information processing apparatus 20.

Furthermore, the information processing apparatus 10 as the master has a mechanism through the communication network 40 in which the information providing server 50 accesses the start-condition setting database 70, the information providing database 71, and the utilization-history-storage setting database 72. Acquired data and software is stored in the main memory or the external storage device.

When the virtual information processing apparatus 20 is formed, by constantly executing a capability program, the information processing apparatus 10 as the master, can monitor apparatus of the other information processing apparatus 11 as the slave.

In addition, the information processing apparatus 11 as the slave includes a notification unit for notifying the information processing apparatus 10 as the master when the apparatus information of the information processing apparatus 11 changes at a level or greater.

In addition, the information processing apparatus 10 has a mechanism for storing function-utilization-history data in the external storage device based on utilization-history-storage setting information and sending the data to the information collecting server 60.

B-3. Configuration of Server

The information providing server 50 includes the start-condition setting database 70, the information providing database 71, and the utilization-history-storage setting database 72.

The start-condition setting database 70 stores functional programs or setting data concerning event-starting conditions. The information providing database 71 stores software which is activated at the start, information data for use in an event, etc. The utilization-history-storage setting database 72 stores utilization-history-storage setting information that, for data recordable as a history, specifies a data item to be recorded in the external storage device in the information processing apparatus. The utilization-history-storage setting information includes a type of functional program, an execution time and date, a load factor, surplus capability, a connected apparatus, and user information.

When being requested by one of the information processing apparatus 10, the information processing apparatus 11, and the virtual information processing apparatus 20, or with predetermined timing set for the information providing server 50, the information providing server 50 provides necessary data and software to each of the information processing apparatuses 10, 20, etc., or the virtual information processing apparatus 20.

In addition, the information collecting server 60 includes the utilization-history database 80 and the statistical information database 81. In the utilization-history database 80, utilization-history data, sent to the information collecting server 60 with predetermined timing after being stored in each information processing apparatus, is stored. In the statistical information database 81, statistical information data collected in a set category unit such as by application or by user-information attribute is stored. A part of data obtained in the statistical information database 81 is reflected in the start-condition setting database 70 and information providing database 71 in the information providing server 50.

For brevity of description, the information providing server 50 and the information collecting server 60 are separated for description. However, in the case of actually forming the information providing server 50 and the information collecting server 60, both may be implemented in a single server apparatus.

B-4. Operating Form

According to the system configuration shown in FIG. 16, the system state, such as surplus processing capability for setting a functional program in the virtual information processing apparatus 20 and a connecting state of the apparatuses, are set as start conditions beforehand. Therefore, when the system state satisfies predetermined start conditions, the functional program set beforehand can be activated. In addition, the virtual information processing apparatus 20 can acquire, from the information providing server 50, start-condition setting information defining the start conditions, and software and data for use at the start.

When the virtual information processing apparatus 20 executes the functional program after the predetermined start conditions are satisfied, a utilization history, such as the type of the functional program, a load factor, surplus capability, a connected apparatus, and user information, is stored as function-utilization history information.

In addition, when the functional program is executed, in the virtual information processing apparatus 20, data recordable as a history or information to be recorded as a history can be defined as utilization-history-storage setting information. The virtual information processing apparatus 20 can acquire, from the information providing server 50, utilization-history-storage setting information that defines a data attribute which is to be recorded as a history.

Such function-utilization history information is collected by the information collecting server 60. The collected information is statistically processed to generate utilization statistical information. The utilization statistical information represents, for example, a combination of information processing apparatuses, a type of functional program, and a frequency at which the functional program is utilized. By generating function-selecting information in accordance with user environments of each user based on the utilization statistical information and providing the function-selecting information to the user, user's convenience can be improved.

An operating form of the system in this embodiment is described below.

In the virtual information processing apparatus 20, after the information processing apparatus 10 acquires apparatus information of another information processing apparatus connected to the local network 30 (e.g., a home network) by executing a capability exchange program, the information processing apparatus 10 calculates total surplus processing capability of the virtual information processing apparatus 20.

In addition, the information processing apparatus 10 acquires, from the information providing server 50, the start-condition setting database 70, the information providing database 71, and the utilization-history-storage setting database 72 with predetermined timing (for example, after a user-set period elapses, or at the time that the information providing server 50 requests the information processing apparatus 10 to update information).

The information processing apparatus 10 as the master in the virtual information processing apparatus 20 acquires, from the start-condition setting database 70, start-condition setting information defining function-program start conditions. The acquired start conditions is compared with the present apparatus information and surplus processing capability value of the virtual information processing apparatus 20. If the start conditions are satisfied, a monitoring program for executing the set functional program is started.

Figure 19:
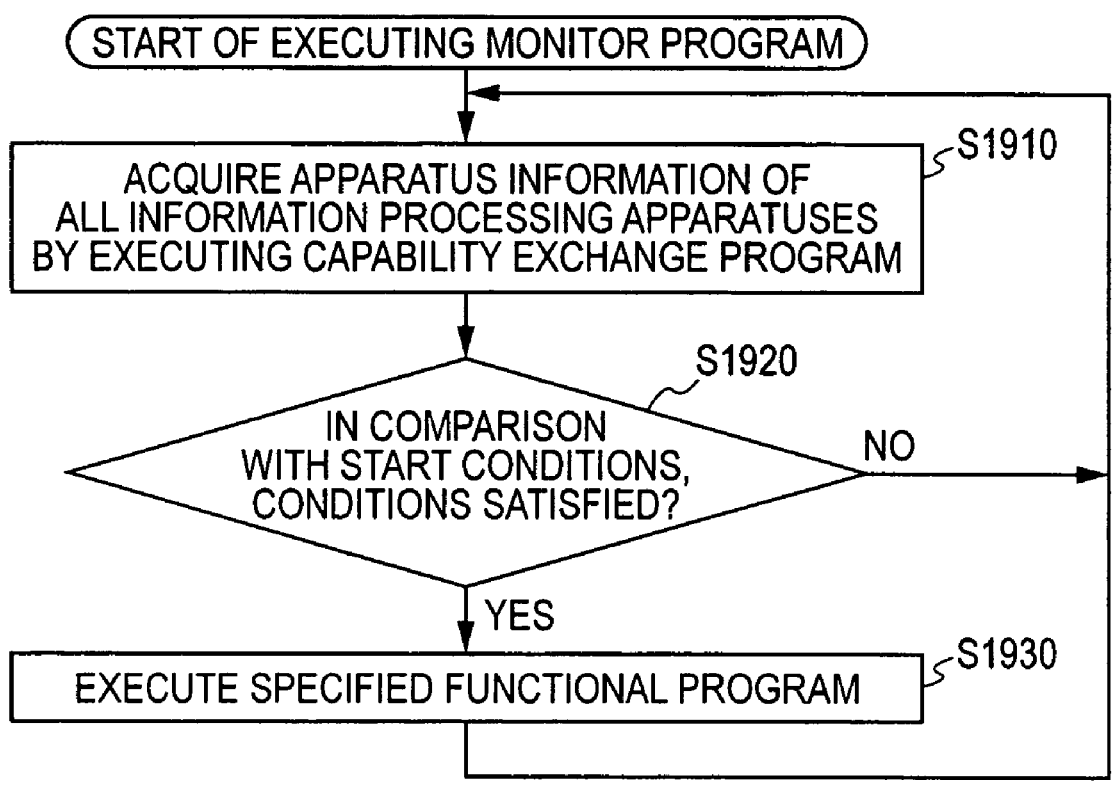
FIG. 19 is a flowchart showing a process for executing a functional program in accordance with whether the start conditions are satisfied.

FIG. 19 shows, in flowchart form, a process for executing the functional program in accordance with whether the start conditions are satisfied.

In step S1910, by executing the above capability exchange program, the information processing apparatus 10 as the master acquires apparatus information of all information processing apparatuses, linked to the information processing apparatus 10, on the local network 30. Here, the information processing apparatus 10 acquires, as the apparatus information, a system state including surplus processing capability of the virtual information processing apparatus 20, and the number and types of the network-connected information processing apparatuses.

In step S1920, by comparing the acquired apparatus information and the start-condition setting information, it is determined whether functional program starting conditions program are satisfied.

If the conditions are satisfied, in step S1930, a specified functional program is executed.

If, in step S1920, the start conditions are not satisfied, the process returns to step S1910, and the capability exchange program is started at preset, predetermined intervals to periodically monitor the apparatus information. Alternatively, by providing an information processing apparatus, which operates as a slave, with a notification unit for notifying an information processing apparatus as a master when apparatus information of the slave changes, the virtual information processing apparatus 20 can cope with a change in apparatus information.

The following Table 1 shows an example of the start-condition setting information that is referred to in step S1920. Table 1 shows, for each program, conditions such as a main-processor operating frequency, a main-memory size, the number of free sub-processors, external-storage-device utilization size, network-connected apparatus ID, user attributes (such as sex and age) to be applied, and start-enabled date and time of function. Although the start-condition setting information is set in the information processing apparatus 10 as the master, it can be also acquired from the start-condition setting database 70 in the information providing server 50.

If the start conditions are satisfied, the specified functional program is executed. In this case, software and data necessary for executing the functional program may be stored beforehand in the external storage device in the information processing apparatus 10, or may be provided from the information providing database 71 in the information providing server 50.

When some functional program is executed by one of the information processing apparatuses 10, 11, etc., which form the virtual information processing apparatus 20, the information processing apparatus 10 as the master generates and stores function-utilization-history data in its external storage device.

Data items which are to be stored as a utilization history at the time of executing the functional program are defined as the utilization-history-storage setting information. Although the utilization-history-storage setting information is set in the information processing apparatus 10 as the master, it can be also acquired from the utilization-history-storage setting database 72 in the information providing server 50.

The following Table 2 shows an example of the utilization-history-storage setting information. Table 2 shows, for each functional program, setting information such as data items that can be stored, which indicate whether they are to be stored as a utilization history, together with a history-storing effective date and time. The setting information includes a user who uses a functional program, load factors (a main-processor load factor, main-memory utilization size, the number of sub-processors in use, external-storage utilization size), and identification information of a connected apparatus.

TABLE 1

| | | | | Surplus Capability | | | | |
|---|---|---|---|---|---|---|---|---|
| Start ID | Function ID | User Attributes Sex | User Attributes Age | Effective Date and Time of Start | Main processor Frequency | Main Memory | Number of Remaining Sub processors | External storage device Utilization Size | Connected Apparatus ID |
| 320 | A0010 | M | 40-60 | 03/20/2004-03/31/2004 | 256 MHz | 512 MB | 2 | 200 GB | Z0030 — — |
| 321 | B0010 | M/F | ALL | To 4/10/2004 | 128 MHz | 256 MB | 0 | 5 GB | — — — |
| 322 | C0010 | F | 18-30 | 03/01/2004-04/30/2004 | 1 GHz | 384 MB | 6 | 30 GB | Z0020 — — |

TABLE 2

| | | | | Load Factors | | | | |
|---|---|---|---|---|---|---|---|---|
| History Storing ID | Function ID | User ID | History-storing Effective Date and Time | Main processor Frequency | Main Memory | Number of Remaining Sub-processors | External storage device Utilization Size | Connected Apparatus ID |
| 401 | A0010 | Stored | 03/20/2004-03/31/2004 | Stored | Stored | Stored | — | Stored |
| 402 | B0010 | Stored | To 04/10/2004 | — | — | — | — | — |
| 403 | C0010 | Stored | 03/01/2004-04/30/2004 | — | — | Stored | Stored | Stored |

For example, in utilization-history-storage setting information of a functional program having a function ID of A0010, on the specified history-storing effective date and time, it is determined that a user who uses the functional program, load factors (a main-processor load factor, main-memory utilization size, the number of sub-processors in use, external-storage utilization size), and a connected apparatus ID are stored.

The following Table 3 shows an example of function-utilization history information stored at the time of executing the functional program in accordance with the utilization-history-storage setting information shown in Table 2. In Table 3, a history ID is assigned to each executed functional program. A function ID, the user ID of a use who uses the functional program, the date and time of use of the functional program, and a utilization history concerning each data item, whose storage is specified in the utilization-history-storage setting information are recorded.

TABLE 3

| History Storing ID | Function ID | User ID | Date and Time of Use | Load Factors | | | | Connected Apparatus ID | | |
|---|---|---|---|---|---|---|---|---|---|---|
| | | | | Main processor Frequency | Main Memory | Number of Remaining Sub processors | External storage device Utilization Size | | | |
| 50070 | B0010 | — | 03/20/2004 19:20-20:40 | — | — | — | — | — | — | — |
| 50071 | A0010 | XY003 | 03/23/2004 11:30-13:00 | | | | | Z0020 | Z0030 | — |
| 50072 | A0010 | XY001 | 03/23/2004 20:00-23:00 | | | | | Z0030 | — | — |
| 50073 | C0010 | XY002 | 03/25/2004 10:30-11:00 | | | | | Z0020 | — | — |
| 50074 | C0010 | XY002 | 03/27/2004 10:30-11:00 | | | | | Z0020 | Z0030 | Z0040 |

The utilization-history-storage setting information can also include a statistical processing method for data in addition to specification of history data to be stored. In this case, by changing the utilization-history-storage setting information, storing of the minimum necessary history data, additional designation of a newly added item, etc., can be easily performed.

The function-utilization-history data stored in each information processing apparatus is sent with predetermined timing to the information collecting server 60, to which the information processing apparatuses 10, 11, etc., can be connected.

The information collecting server 60 stores the acquired utilization-history data in the utilization-history database 80, and generates utilization information classified by apparatus information or by surplus capability. This makes it possible to acquire statistical information such as information about what type of information processing apparatus the user connects in what type of environment, or a frequency at which a function is utilized.

Based on the statistical information acquired as described above in the information collecting server 60, conditions under which a function having a high frequency of use can be executed, including another user in a certain condition, are calculated, and function-selecting information in accordance with environments of each user is generated. By reflecting the function-selecting information in the start-condition setting database 70 and the information providing database 71, improvement in convenience can be performed, such as starting of a set functional program and reporting information when, in the next time, the user has similar connecting environments or status.

Figure 20:
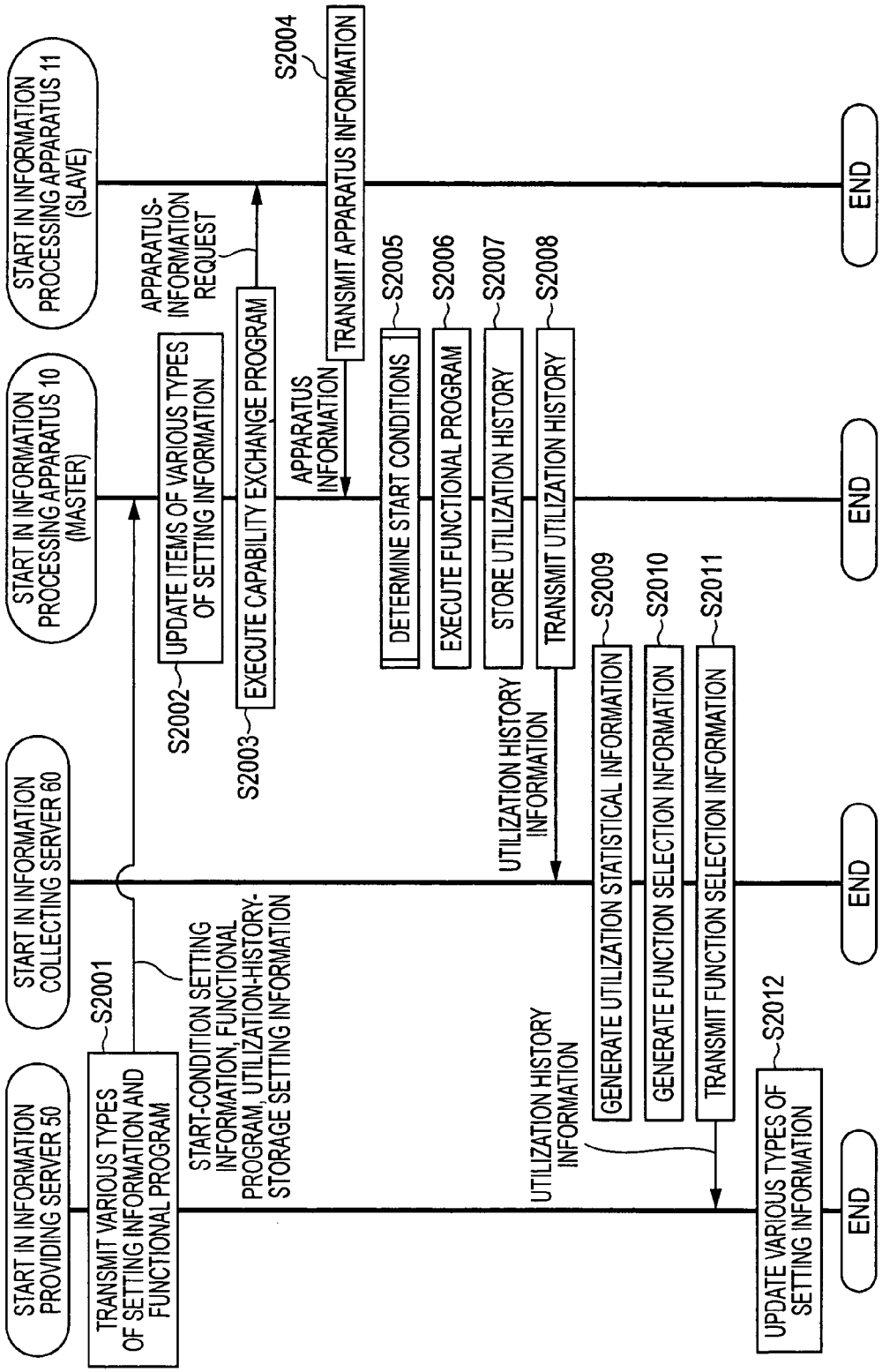
FIG. 20 is a flowchart showing an operating process for realizing a system operating form in a virtual information processing apparatus according to an embodiment of the present invention.

FIG. 20 shows an operating process for realizing the above system operating form.

In step S2001, the information providing server 50 transmits, to the information processing apparatus 10 which operates as the master for the virtual information processing apparatus 20, various types of setting information such as start-condition setting information and utilization-history setting information, and the functional program to be executed by the virtual information processing apparatus 20 and data for use.

In step S2002, after receiving the various types of setting information, the information processing apparatus 10 updates various setting items (see Tables 1 and 2) such as the start-condition setting information and utilization-history setting information.

In step S2003, the information processing apparatus 10 requests apparatus information from the information processing apparatus 11 as the slave by executing the capability exchange program. In step S2004, the information processing apparatus 11 responds with the requested apparatus information. The virtual information processing apparatus 20 may include a plurality of slaves other than the information processing apparatus 11. For brevity of FIG. 20, the slaves are not shown.

Similarly to the case of the apparatus-information table, the capability exchange program activated in the information processing apparatus 10 as the master reserves, in its main memory, an area for storing apparatus information (see FIG. 4) of all slaves, and records the information in the form of an apparatus-information table concerning the slaves. In addition, in the main memory of the slave, apparatus information of the slave is recorded as an apparatus-information table, and information-processing-apparatus IDs and MS statuses of the master and the slave are recorded as another apparatus-information table.

In each of the master and the slave, when the MS manager reports that an information processing apparatus (not shown) is newly connected to the network, the capability exchange program acquires and records, in the main memory 26, apparatus information of the newly connected information processing apparatus, as described above.

Based on the apparatus information received from each slave, the information processing apparatus 10 can acquire the surplus processing capability of the virtual information processing apparatus 20 and a system state including the types and number of network-connected apparatuses. In step S2005, the information processing apparatus 10 as the master performs start condition determination concerning whether the acquired system state satisfies the start conditions set in step S2002.

In step S2006, if the system state of the virtual information processing apparatus 20 satisfies the start conditions, the virtual information processing apparatus 20 executes a corresponding functional program.

The execution of the functional program may be performed by the information processing apparatus 10 as the master itself. However, one slave having surplus capability may be requested to execute the functional program. In the latter case, the information processing apparatus 10 as the master requests the information processing apparatus 11 as the slave to load the functional program. After receiving the loading request, the information processing apparatus 11 loads the functional program and responds with a loading completion report. After receiving the completion report, the information processing apparatus 10 orders the information processing apparatus 11 to execute the functional program, and the information processing apparatus 11 executes the functional program.

When the information processing apparatus 10 or 11 executes the functional program, in step S2007, function-utilization history information is stored in accordance with utilization-history-storage setting information concerning the functional program. When the functional program is executed by the slave, after the execution of the functional program finishes, the function-utilization history information is stored in the information processing apparatus 10 as the master.

In step S2008, the information processing apparatus 10 transmits the function history information to the information collecting server 60 with predetermined timing.

In step S2009, the information collecting server 60 generates utilization statistical information by performing predetermined statistical processing on the collected utilization history information. The utilization statistical information represents, for example, a combination of information processing apparatuses, a frequency of utilization of the functional program, etc.

In step S2010, based on the utilization statistical information, the information collecting server 60 further generates function-selecting information in accordance with environments of each user. In step S2011, the information collecting server 60 transmits the function-selecting information to the information providing server 50.

In step S2012, based on the function-selecting information, the information providing server 50 updates setting items of the various types of setting information such as start-condition setting information and utilization-history-storage setting information. As a result, service contents concerning the start of the functional program can enhanced, thus improving user's convenience. In other words, the utilization statistical information obtained from utilization history information of a user is returned to the user.

Finally, a use case concerning setting of start conditions and storing of utilization history information in the virtual information processing apparatus 20 according to this embodiment is described below.

Example of Setting of Start Conditions

For example, it is assumed that, in a system state in which the virtual information processing apparatus 20 has, as surplus capability, a main-processor operating frequency of 256 MHz, a main-memory size of 512 megabytes, two remaining sub-processors, and an external-storage-device size of 20 gigabytes, and an apparatus having an apparatus ID of Z0030 is connected as a slave, when the user is male, the age is 40's to 60's, and the date and time is Mar. 20, 2004 to Mar. 31, 2004, a functional program (ID: A0010) needs to be executed.

In this case, the settings shown in the top row (start ID: 320) of the start-condition-setting information table (Table 1) are used.

Similarly, in a system state in which the virtual information processing apparatus 20 has, as surplus capability, a main-processor operating frequency of 128 MHz, a main-memory size of 256 megabytes, zero remaining sub-processors, and an external-storage-device size of 5 gigabytes, when the date and time is specified as to Apr. 10, 2004, and a functional program (ID: B0010) needs to be executed, the settings shown in the second row (start ID: 321) in the start-condition-setting information table (Table 1) are used.

As an example of the use case, a case in which the virtual information processing apparatus 20 is a hard disk recorder is described below.

It is assumed that, when a program is recorded, the virtual information processing apparatus 20 has a plurality of functions such as (1) multichannel recording, (2) high-quality picture processing, and (3) denoising. In addition, there is limitation in which only one of corresponding functional programs is executable from a viewpoint of surplus capability of the virtual information processing apparatus 20.

In such a case, start-condition setting information for changing priority selection in accordance with user attributes and a frequency of past utilization of a user are provided. For example, as one start condition, setting information for performing high-resolution processing is provided for elderly users who prefer picture quality. In addition, setting information for performing multichannel recording is provided for younger generation users who have diverse interests. This makes it possible to improve convenience for each type of users.

In addition, a similar case in which the virtual information processing apparatus 20 is a hard disk recorder is described below as another example of the user case.

It is assumed that, when a program is recorded, the surplus capability at the time of the virtual information processing apparatus 20 is insufficient to perform high-quality processing desired by a user. Here, in the surplus capability, start-condition setting information for starting a functional program that confirms whether a new program is registered in the information providing server 50 is set.

In this case, in the information providing server 50, a simplified high-resolution processing program having a reduced amount of processing is provided. When the virtual information processing apparatus 20 is in certain surplus capability conditions, the information processing apparatus 10 as the master automatically downloads a simplified program, and uses the program after replacing the existing functional program. This enables the user to execute a targeted function without wasting the user's time and paying attention to the surplus capability of the virtual information processing apparatus 20.

Example of Utilization History Storing Setting

Regarding information concerning a utilization history at a function executing time, for example, when the virtual information processing apparatus 20 executes a function with another information processing apparatus in combination, what case is most common for linking the virtual information processing apparatus 20 to one information processing apparatus, or when a function is executed, what case is most common concerning the amount of size used in the main memory, it is very useful for the standpoint of an application or a functional program developer to know actual user's use environments. Data items necessary (whose histories are to be stored) at the time vary depending on applications or functional programs.

Accordingly, by setting, as utilization-history-storage setting information, histories to be stored in accordance with the functions, only data that is really necessary can be stored without leaving unnecessary data. In addition, a load in the case of transmitting the history to the information collecting server 60, which collects the utilization history information, and a processing load in generation of function-selecting information based on statistical processing on utilization history information and utilization statistical information in the information collecting server 60 are reduced.

Here, the above-described Table 2 is mentioned as an example. When a developer needs a detailed history of a new function (function ID: A0010), many items, such as the main-processor load factor, the main-memory utilization size, the number of sub-processors used, and the connected apparatus ID, are set so as to be stored.

In addition, regarding a function (function ID: B0010) that needs, as a history, information about whether the function is simply used, utilization-history storage information is set so that only the user ID is stored and that a history of the surplus capability is not stored.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An information processing system comprising:
a plurality of information processing apparatuses connected to a network, the information processing apparatuses being mutually linked to operate as a virtual information processing apparatus, the virtual information processing apparatus configured to execute an executable function;
at least one processor; and
at least one memory device which stores a plurality of instructions, which when executed by the at least one processor, cause the at least one processor to:
(i) generate and transmit a software cell of a status request command to at least a first one of the plurality of information processing apparatuses;
(ii) receive apparatus information of at least the first one of the information processing apparatuses;
(iii) determine a system state of the virtual information processing apparatus based, at least in part, on the apparatus information of the first one of the information processing apparatuses, the system state indicating:
(a) any surplus processing capability of the virtual information processing apparatus, and
(b) a configuration of the information processing apparatuses connected to the network; and
(iv) when the system state of the virtual information processing apparatus satisfies predetermined start conditions:
(a) cause the executable function to be executed;
(b) cause executable function utilization history information to be generated when the executable function is executed; and
(c) cause the generated executable function utilization history information to be stored; and,
(v) when the system state of the virtual information processing apparatus does not satisfy predetermined start conditions, at least one information processing apparatus transmits a notification of a change in apparatus information when the apparatus information changes.

2. The information processing system of claim 1, wherein the apparatus information of the first one of the information processing apparatuses is stored in an information providing server connected to the network.

3. The information processing system of claim 2, wherein start-condition setting information is stored in the information providing server.

4. The information processing system of claim 2, wherein the executable function is stored in the information providing server.

5. The information processing apparatus of claim 2, wherein:
utilization-history-storage setting information which specifies data items to be stored as the executable function utilization history information is acquired from the information providing server; and
the plurality of instructions, when executed by the at least one processor, cause the at least one processor to cause the data items specified by the utilization-history-storage setting information to be stored as the executable function history information.

6. The information processing system of claim 1, wherein the stored executable function utilization history information is sent to an information collecting server connected to the network.

7. The information processing system of claim 6, wherein, based on the stored executable function utilization history information, the information collecting server generates statistical information of utilization including a type of combination of information processing apparatuses, a type of executable function utilized, and a frequency of utilization of the executable function.

8. The information processing system of claim 7, which includes at least one display device and wherein when executed by the at least one processor, the plurality of instructions cause the at least one processor to operate with the at least one display device to display the statistical information of utilization generated by the information collecting server to a user.

9. A method of operating an information processing system including a plurality of instructions, the method comprising:
connecting a plurality of information processing apparatuses to a network such that the plurality of information processing apparatuses are mutually linked to operate as a virtual information processing apparatus, the virtual information processing apparatus configured to execute an executable function;
generating and transmitting a software cell of a status request command to at least a first one of the plurality of information processing apparatuses;
receiving apparatus information of at least the first one of the information processing apparatuses;
causing the at least one processor to determine a system state of the virtual information processing apparatus based, at least in part, on the apparatus information of the first one of the information processing apparatuses, the system state indicating:
(a) any surplus processing capability of the virtual information processing apparatus, and (b) a configuration of the information processing apparatuses connected to the network; and when the system state satisfies predetermined start conditions:

(a) executing the executable function;

(b) generating executable function utilization history information when the executable function is executed; and (c) storing the generated executable function utilization history information, and when the system state does not satisfy predetermined start conditions, at least one information processing apparatus transmitting a notification of a change in apparatus information when the apparatus information changes.

10. The method of claim 9, wherein the apparatus information is stored in an information providing server connected to the network.

11. The method of claim 10, wherein start-condition setting information is stored in the information providing server.

12. The method of claim 10, wherein the executable function is stored in the information providing server.

13. The method of claim 10, which includes:

acquiring utilization-history-storage setting information which specifies data items to be stored as the executable function utilization history information; and storing the data items specified by the utilization-history-storage setting information as the executable function utilization history information.

14. The method of claim 9, which includes sending the executable function utilization history information to an information collecting server connected to the network.

15. The method of claim 14, which includes generating statistical information of utilization based on the executable function utilization history information collected in the information collecting server, and which includes a type of combination of information processing apparatuses, a type of executable function utilized, and a frequency of utilization of the executable function.

16. A non-transitory computer-readable medium encoded with instructions for causing at least one processor to:

operate with a plurality of information processing apparatuses connected to a network, the information processing apparatuses being mutually linked to operate as a virtual information processing apparatus, the virtual information process apparatus configured to execute an executable function; and generate and transmit a software cell of a status request command to at least a first one of the plurality of information processing apparatuses;

receive apparatus information of at least the first one of the information processing apparatuses;

determine a system state of the virtual information processing apparatus based, at least in part, on the apparatus information of the first one of the information processing apparatuses, the system state indicating:

(a) any surplus processing capability of the virtual information processing apparatus, and (b) the configuration of the information processing apparatuses connected to the network; and when the system state satisfies predetermined start conditions:

(a) cause the executable function to be executed;

(b) cause executable function utilization history information to be generated when the executable function is executed; and (c) cause the generated executable function history information to be stored, and when the system state does not satisfy predetermined start conditions, cause at least one information processing apparatus to transmit a notification of a change in apparatus information when the apparatus information changes.

17. An information processing system comprising:

a plurality of information processing apparatuses connected to a network, the information processing apparatuses being mutually linked to operate as a virtual information processing apparatus, the virtual information processing apparatus configured to execute an executable function;

at least one processor; and at least one memory device which stores a plurality of instructions, which when executed by the at least one processor, cause the at least one processor to:

(i) generate and transmit a software cell of a status request command to at least a first one of the plurality of information processing apparatuses;

(ii) receive apparatus information of at least the first one of the information processing apparatuses;

(iii) operate with a monitoring unit to periodically monitor a system state of the virtual information processing apparatus, the system state being based, at least in part, on the apparatus information of the first one of the information processing apparatuses and the system state indicating (a) any surplus processing capability of the virtual information processing apparatus, and (b) a configuration of the information processing apparatuses connected to the network; and (iv) when the system state satisfies predetermined start conditions:

(a) operate with a function executing unit to execute the executable function; and (b) operate with an executable-function-utilization-history-information storing unit to store executable function utilization history information generated when the executable function is executed by the function executing unit, and (v) when the system state does not satisfy predetermined start conditions, at least one information processing apparatus transmits a notification of a change in apparatus information when the apparatus information changes.

* * * * *